(12) United States Patent
Hosoi et al.

(10) Patent No.: US 12,435,185 B2
(45) Date of Patent: Oct. 7, 2025

(54) METHOD FOR PRODUCING 1,1,1-TRIFLUORO-2,2-BISARYLETHANE, AND 1,1,1-TRIFLUORO-2,2-BISARYLETHANE

(71) Applicant: Central Glass Company, Limited, Ube (JP)

(72) Inventors: Kenji Hosoi, Kawagoe (JP); Kensuke Hirotaki, Kawagoe (JP); Yosuke Murakami, Kawagoe (JP); Hiroto Hori, Kawagoe (JP); Hiroshi Eguchi, Kawagoe (JP)

(73) Assignee: Central Glass Company, Limited, Ube (JP)

( * ) Notice: Subject to any disclaimer, the term of this patent is extended or adjusted under 35 U.S.C. 154(b) by 712 days.

(21) Appl. No.: 17/428,762

(22) PCT Filed: Feb. 3, 2020

(86) PCT No.: PCT/JP2020/003964
§ 371 (c)(1),
(2) Date: Aug. 5, 2021

(87) PCT Pub. No.: WO2020/162408
PCT Pub. Date: Aug. 13, 2020

(65) Prior Publication Data
US 2022/0106444 A1    Apr. 7, 2022

(30) Foreign Application Priority Data
Feb. 6, 2019   (JP) ................. 2019-019823

(51) Int. Cl.
| | |
|---|---|
| *C08G 73/10* | (2006.01) |
| *C07C 17/32* | (2006.01) |
| *C07C 22/08* | (2006.01) |
| *C07C 37/62* | (2006.01) |
| *C07C 39/16* | (2006.01) |
| *C07C 41/30* | (2006.01) |
| *C07C 43/225* | (2006.01) |
| *C07C 201/12* | (2006.01) |
| *C07C 205/22* | (2006.01) |
| *C07C 209/78* | (2006.01) |
| *C07C 211/56* | (2006.01) |
| *C07C 213/08* | (2006.01) |
| *C07C 215/80* | (2006.01) |
| *C08G 73/12* | (2006.01) |

(52) U.S. Cl.
CPC .......... *C08G 73/1039* (2013.01); *C07C 17/32* (2013.01); *C07C 22/08* (2013.01); *C07C 37/62* (2013.01); *C07C 39/16* (2013.01); *C07C 41/30* (2013.01); *C07C 43/225* (2013.01); *C07C 201/12* (2013.01); *C07C 205/22* (2013.01); *C07C 209/78* (2013.01); *C07C 211/56* (2013.01); *C07C 213/08* (2013.01); *C07C 215/80* (2013.01); *C08G 73/1028* (2013.01); *C08G 73/1078* (2013.01); *C08G 73/123* (2013.01)

(58) Field of Classification Search
None
See application file for complete search history.

(56) References Cited

U.S. PATENT DOCUMENTS

| | | | |
|---|---|---|---|
| 3,179,614 A | | 4/1965 | Edwards |
| 3,388,097 A | | 6/1968 | Cramer |
| 3,770,573 A | | 11/1973 | Dunphy et al. |
| 4,365,098 A | * | 12/1982 | Mark ................. C07C 39/367 568/726 |
| 4,467,121 A | * | 8/1984 | Mark ................. C07C 37/16 568/726 |
| 4,803,147 A | | 2/1989 | Mueller et al. |
| 7,825,280 B2 | | 11/2010 | Saegusa et al. |
| 7,932,348 B2 | | 4/2011 | Saegusa et al. |
| 8,153,753 B2 | | 4/2012 | Moriyama et al. |
| 10,683,252 B2 | | 6/2020 | Hosoi et al. |
| 10,882,809 B2 | | 1/2021 | Hosoi et al. |
| 11,267,216 B2 | | 3/2022 | Okuyama et al. |
| 2006/0106193 A1 | | 5/2006 | Moriyama et al. |
| 2009/0023886 A1 | | 1/2009 | Saegusa et al. |

(Continued)

FOREIGN PATENT DOCUMENTS

| | | |
|---|---|---|
| CN | 106832278 A | 6/2017 |
| GB | 1036870 | 7/1966 |

(Continued)

OTHER PUBLICATIONS

International Search Report (PCT/ISA/210) issued in PCT Application No. PCT/JP2020/003964 dated Apr. 14, 2020 with English translation (17 pages).
Japanese-language Written Opinion (PCT/ISA/237) issued in PCT Application No. PCT/JP2020/003964 dated Apr. 14, 2020 (eight (8) pages).

(Continued)

*Primary Examiner* — Marc S Zimmer
(74) *Attorney, Agent, or Firm* — Crowell & Moring LLP

(57) ABSTRACT

The present invention has the effect of making it possible to produce 1,1,1-trifluoro-2,2-bisarylethane efficiently by a simple procedure by condensing a mixture of fluoral and hydrogen fluoride with an aryl compound under anhydrous conditions. The purity of the 1,1,1-trifluoro-2,2-bisarylethane obtained can be raised by a simple purification method such as crystallization or distillation. The obtained 1,1,1-trifluoro-2,2-bisarylethane can be increased in purity by a simple purification method such as crystallization operation or distillation.

12 Claims, No Drawings

(56) References Cited

U.S. PATENT DOCUMENTS

| | | |
|---|---|---|
| 2010/0234556 A1 | 9/2010 | Saegusa et al. |
| 2019/0345086 A1 | 11/2019 | Hosoi et al. |
| 2019/0352246 A1 | 11/2019 | Hosoi et al. |
| 2020/0180259 A1 | 6/2020 | Okuyama et al. |
| 2020/0395289 A1* | 12/2020 | Kim .................... C09D 7/69 |
| 2022/0106444 A1 | 4/2022 | Hosoi et al. |
| 2022/0119595 A1 | 4/2022 | Eguchi et al. |

FOREIGN PATENT DOCUMENTS

| | | |
|---|---|---|
| JP | 57-502055 A | 11/1982 |
| JP | 2-870 A | 1/1990 |
| JP | 2002-356615 A | 12/2002 |
| JP | 2007-119504 A | 5/2007 |
| JP | 2016-76480 A | 5/2016 |
| JP | 2016-76481 A | 5/2016 |
| WO | WO 2004/039863 A1 | 5/2004 |
| WO | WO 2016/117237 A1 | 4/2017 |
| WO | WO 2018/123649 A1 | 7/2018 |
| WO | WO 2018/139427 A1 | 8/2018 |
| WO | WO 2019/013182 A1 | 1/2019 |
| WO | WO 2019/216163 A1 | 11/2019 |
| WO | WO 2020/060265 * | 3/2020 |
| WO | WO 2020/162408 A1 | 8/2020 |
| WO | WO 2020/162411 A1 | 8/2020 |

OTHER PUBLICATIONS

G. K. Surya Prakash et al., "Fluoroanalogs of DDT: Superacidic $BF_3$—$H2O$ catalyzed facile synthesis of 1, 1, 1,-trifluoro-2, 2-diarylethanes and 1, 1-difluoro-2, 2-diarylethanes.", Organic Letters, 2011, 13(15), 4128-4131. (four (4) pages.
Peter, Delvigs et al., "Addition polyimides from non-mutagenic diamines.", High performance polymers, 2001, 13, 301-312. (12 pages).
International Search Report (PCT/ISA/210) issued in PCT Application No. PCT/JP2020/003969 dated Apr. 7, 2020 with English translation (four (4) pages).
Japanese-language Written Opinion (PCT/ISA/237) issued in PCT Application No. PCT/JP2020/003969 dated Apr. 7, 2020 (four (4) pages).
Chinese-language Office Action issued in Chinese Application No. 202080013067.2 dated Jan. 12, 2023 (six (6) pages).
International Search Report (PCT/ISA/210) issued in PCT Application No. PCT/JP2021/025559 dated Sep. 14, 2021 with English translation (four (4) pages).
Japanese-language Written Opinion (PCT/ISA/237) issued in PCT Application No. PCT/JP2021/025559 dated Sep. 14, 2021 (four (4) pages).
Japanese-language Office Action issued in Japanese Application No. 2020-571191 dated Aug. 1, 2023 with English translation (6 pages).
U.S. Non-Final Office Action issued in U.S. Appl. No. 17/428,860 dated Jun. 10, 2024 (21 pages).
U.S. Final Office Action issued in U.S. Appl. No. 17/428,860 dated Sep. 17, 2024 (19 pages).
Korean-language Office Action issued in Korean Application No. 10-2021-7027909 dated Nov. 14, 2024 (13 pages).
English language Office Action issued in related U.S. Appl. No. 17/428,860 dated Jan. 27, 2025 (18 pages).
Korean-language Decision to Grant issued in corresponding Korean patent application (No. 2021-7027893) dated Feb. 6, 2025 (3 pages, with English Translation).

* cited by examiner

METHOD FOR PRODUCING 1,1,1-TRIFLUORO-2,2-BISARYLETHANE, AND 1,1,1-TRIFLUORO-2,2-BISARYLETHANE

TECHNICAL FIELD

The present invention relates to a method for producing 1,1,1-trifluoro-2,2-bisarylethane and 1,1,1-trifluoro-2,2-bisarylethane.

BACKGROUND ART 2,2-bisarylethane, which has a special skeleton, is a resin raw material monomer (polycarbonate, epoxy, and polyimide) mainly used for high-performance members in the fields of electronics and mobility, like a general-purpose resin monomer 2,2-bis(4-hydroxyphenyl)propane (common name: bisphenol A). As disclosed in International Publication No. WO 2016/117237, the resin obtained from 2,2-bis(4-hydroxyphenyl)ethane (common name: bisphenol E), which is one of the representative compounds of 2,2-bisarylethane, is generally known to have very unique physical properties that can achieve both flexibility and high heat resistance. On the other hand, the resin obtained from 1,1,1-trifluoro-2,2-bisarylethane, which has a trifluoromethyl group in a central skeleton thereof, which is the subject of the present invention, is an excellent optical material having physical properties such as low dielectric constant, low refractive index, high transparency, and high solubility, and several production methods thereof are known so far.

As related arts relating to a method for producing 1,1,1-trifluoro-2,2-bisarylethane, there are disclosed a method in which a hydrate, which is an equivalent of fluoral (2,2,2-trifluoroacetaldehyde), is treated with phenol in the presence of hydrogen fluoride to obtain 1,1,1-trifluoro-2,2-bis(4-hydroxyphenyl)ethane (Patent Document 1); a method in which fluoral methyl hemiacetal is reacted with phenols in the presence of hydrogen chloride gas to obtain the corresponding 1,1,1-trifluoro-2,2-bisarylethane (Patent Document 2); a method in which fluoral methyl hemiacetal is reacted with aromatic hydrocarbons in the presence of boron trifluoride ($BF_3$) as a Lewis acid catalyst to synthesize 1,1,1-trifluoro-2,2-bisarylethane (Non-Patent Document 1); and a method in which 1,1,1-trifluoro-2,2-bis(4-aminophenyl)ethane is obtained from fluoral ethyl hemiacetal and aniline (Non-Patent Document 2).

On the other hand, a method for producing 1,1,1-trifluoro-2,2-bisarylethane from anhydrous fluoral stabilized in hydrogen fluoride, which is disclosed in the present invention, has not been reported.

RELATED DOCUMENT

Patent Document

[Patent Document 1] Specification of U.S. Pat. No. 3,388,097
[Patent Document 2] PCT Japanese Translation Patent Publication No. S57-502055

Non-Patent Document

[Non-Patent Document 1] ORGANIC LETTERS, 2011, Vol. 13, No. 15, pp. 4128 to 4131
[Non-Patent Document 2] HIGH PERFORMANCE POLYMERS, 2001, Vol. 13, No. 4, pp. 301 to 312

SUMMARY OF THE INVENTION

Technical Problem

Generally, in order to efficiently obtain the desired 1,1,1-trifluoro-2,2-bisarylethane by a condensation reaction of an aryl compound with fluoral, it is preferable to add a Bronsted acid or a Lewis acid to promote the reaction. In this condensation reaction, a stoichiometric amount of water is formally generated to obtain a target product, but considering the physical properties of a Bronsted acid or a Lewis acid added as a catalyst, it is preferable that these additives are in an anhydrous reaction state as much as possible. However, it is common for fluoral to utilize a relatively stable hydrate or hemiacetal as an equivalent thereof, which is usually commercially available containing water or alcohol in excess of the stoichiometric amount and therefore it is difficult to say that such fluoral hydrate or hemiacetal is in an anhydrous reaction state. The raw material, fluoral, is generally a highly polymerizable compound and is a compound that is difficult to handle by itself. For this reason, it is extremely difficult to prepare and use anhydrous fluoral for the condensation reaction.

In the production examples of 1,1,1-trifluoro-2,2-bisarylethane (Patent Documents 1 and 2 and Non-Patent Documents 1 and 2), fluoral, which is a raw material, is used as a hydrate or hemiacetal which is an equivalent thereof, and therefore there is a concern that water or alcohol generated from the raw material fluoral may inhibit the reaction as the reaction progresses. Therefore, it was necessary to add a large excess of a Bronsted acid or a Lewis acid as an additive in order for the reaction to proceed smoothly. In addition, the yield of 1,1,1-trifluoro-2,2-bisarylethane obtained by the reaction was often moderate.

An object of the present invention is to provide a method for efficiently producing 1,1,1-trifluoro-2,2-bisarylethane from anhydrous fluoral, which is inexpensive and highly reactive, by a simple operation.

Solution to Problem

In view of the foregoing problems, the present inventors have conducted intensive studies. As a result, it has been found that 1,1,1-trifluoro-2,2-bisarylethane represented by General Formula [1] can be selectively obtained by subjecting an aryl compound represented by General Formula [1] to a condensation reaction with respect to a mixture of fluoral and hydrogen fluoride (in the present specification, the mixture may be referred to as a "fluoral/hydrogen fluoride mixture") under anhydrous conditions.

[1]

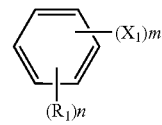

[In General Formula [1], $X_1$'s each independently represent a hydroxyl group, an amino group, a carboxyl group, or a halogen, and m represents an integer of 0 to 3. $R_1$'s each independently represent a monovalent organic group, and n represents an integer of 0 to (5−m).]

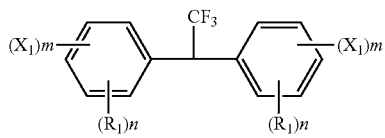

[In General Formula [2], $X_1$, $R_1$, m, and n each have the same definition as $X_1$, $R_1$, m, and n in General Formula [1].]

Upon focusing on fluoral as a raw material used in the present invention, the production method thereof, as disclosed in Japanese Unexamined Patent Publication No. H03-184933, is capable of converting chloral into fluoral almost quantitatively by a catalytic vapor phase fluorination reaction of inexpensive chloral (2,2,2-trichloroacetaldehyde). However, due to the physical properties of the compound, it was very difficult to remove hydrogen fluoride and hydrogen chloride used in the reaction from the obtained reaction mixture, and a complicated purification operation was required.

However, it has been newly found that, in a case where the reaction mixture of fluoral, hydrogen fluoride, and hydrogen chloride obtained by this method is handled under anhydrous conditions, it is surprisingly possible to preferentially remove hydrogen chloride from the reaction mixture by refluxing hydrogen fluoride under normal pressure, and the fluoral can be stably handled as a solution of a fluoral/hydrogen fluoride mixture. In a case where an aryl compound is added to the fluoral/hydrogen fluoride mixture, the remaining hydrogen fluoride has a function as an acidic substance possessed by itself and is therefore expected to act as an acid catalyst or a dehydrating agent.

Furthermore, it has been preferably found that the reaction rate is dramatically improved by coexisting Bronsted acid or Lewis acid as an additive in the reaction system. It is presumed that this is because the additive functions as an accelerator for the dehydration reaction, facilitating the progress of the condensation reaction. The obtained 1,1,1-trifluoro-2,2-bisarylethane can be increased in purity by a simple purification method such as crystallization operation or distillation, and the usefulness and value of the present invention are extremely high. In addition, it has been found that a polyimide having physical properties such as high transparency and high solubility can be easily produced by reacting an aromatic diamine with a tetracarboxylic dianhydride using 1,1,1-trifluoro-2,2-bisarylethane.

That is, the present invention provides 1,1,1-trifluoro-2,2-bisarylethane and a method for producing a polyimide using 1,1,1-trifluoro-2,2-bisarylethane described in the following [Invention 1] to [Invention 13], and further provides 1,1,1-trifluoro-2,2-bisarylethane described in the following [Invention 14] to [Invention 37].

[Invention 1]

A production method for obtaining 1,1,1-trifluoro-2,2-bisarylethane represented by General Formula [2] by subjecting an aryl compound represented by General Formula [1] to a condensation reaction with a mixture of fluoral and hydrogen fluoride under anhydrous conditions.

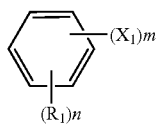

[In General Formula [1], $X_1$'s each independently represent a hydroxyl group, an amino group, a carboxyl group, or a halogen, and m represents an integer of 0 to 3. $R_1$'s each independently represent a monovalent organic group, and n represents an integer of 0 to (5−m).]

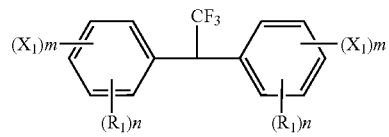

[In General Formula [2], $X_1$, $R_1$, m, and n each have the same definition as $X_1$, $R_1$, m, and n in General Formula [1].]

[Invention 2]

The production method according to Invention 1, in which a Lewis acid or a Bronsted acid is added as an additive to the reaction.

[Invention 3]

The production method according to Invention 2, in which the Lewis acid or the Bronsted acid is at least one selected from the group consisting of an inorganic acid, an organic acid, and a metal halide.

[Invention 4]

The production method according to Invention 3, in which the inorganic acid is at least one selected from the group consisting of phosphoric acid, hydrogen chloride, hydrogen bromide, concentrated nitric acid, concentrated sulfuric acid, fuming nitric acid, and fuming sulfuric acid, and the organic acid is at least one selected from the group consisting of formic acid, acetic acid, oxalic acid, benzoic acid, methanesulfonic acid, benzenesulfonic acid, paratoluenesulfonic acid, and trifluoromethanesulfonic acid.

[Invention 5]

The production method according to Invention 2, in which the metal halide is a metal halide containing at least one metal selected from the group consisting of boron (III), tin (II), tin (IV), titanium (IV), zinc (II), aluminum (III), antimony (III), and antimony (V).

[Invention 6]

The production method according to Invention 2, in which the metal halide is at least one selected from the group consisting of boron (III) trifluoride), aluminum (III) trichloride, zinc (II) dichloride, titanium (IV) tetrachloride, tin (IV) tetrachloride, and antimony (V) pentachloride.

[Invention 7]

The production method according to any one of Inventions 1 to 6, in which the reaction is carried out without using an organic solvent.

[Invention 8]

The production method according to any one of Inventions 1 to 7, in which the reaction is carried out in a temperature range of −20° C. to +200° C. and a pressure range of 0.1 MPa to 4.0 MPa (absolute pressure).

[Invention 9]

A production method for obtaining a polyimide including:
  a step of obtaining an aromatic diamine represented by General Formula [2A]; and
  polycondensing the aromatic diamine with a tetracarboxylic dianhydride represented by General Formula [17] to obtain a polyimide having a repeating unit represented by General Formula [18].

[2A]

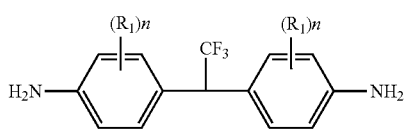

[In General Formula [2A], n is an integer of 0 to 4, and $R_1$'s each independently represent a monovalent organic group.]

[17]

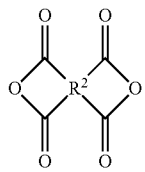

[In General Formula [17], $R^2$ is a tetravalent organic group.]

[18]

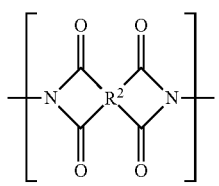

[In General Formula [18], $R^1$ is a divalent organic group represented by General Formula [2B], and $R^2$ is a tetravalent organic group]

[2B]

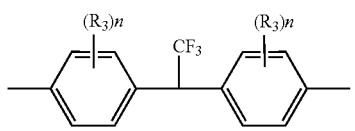

[In General Formula [2B], n is an integer of 0 to 4, and $R_3$ has the same definition as $R_1$ in General Formula [2A].]

[Invention 10]

The production method according to Invention 9, in which $R^1$ is at least one divalent organic group selected from the following.

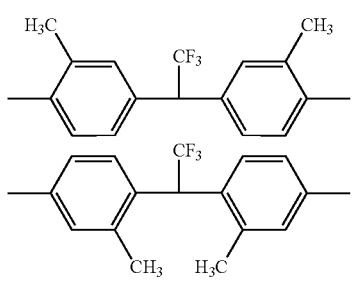

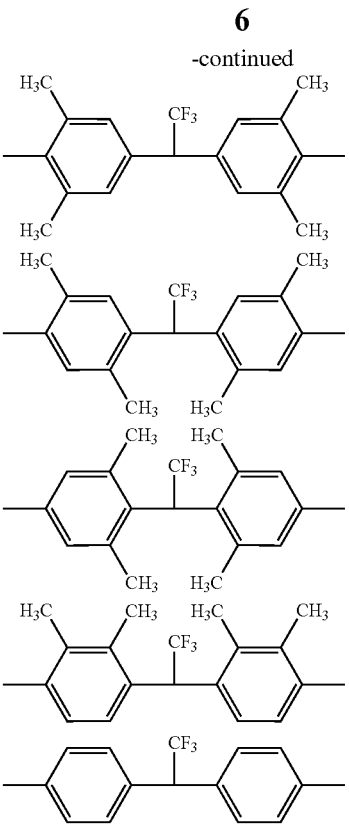

[Invention 11]

The production method according to Invention 9 or 10, in which $R^2$ is at least one tetravalent organic group selected from the following.

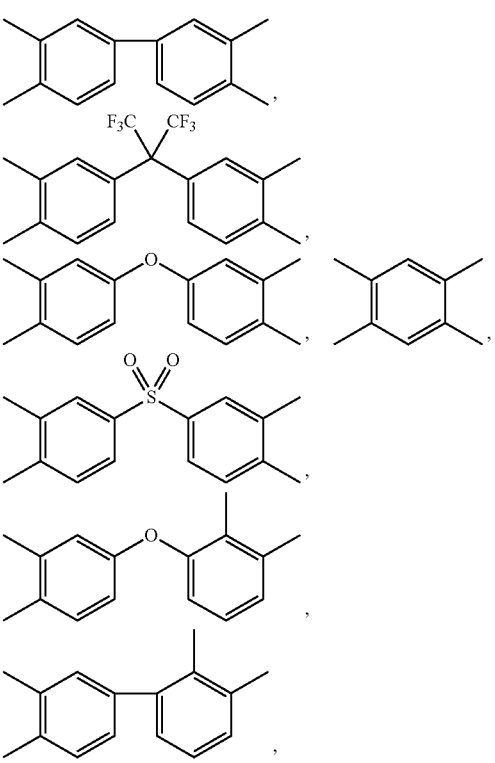

-continued

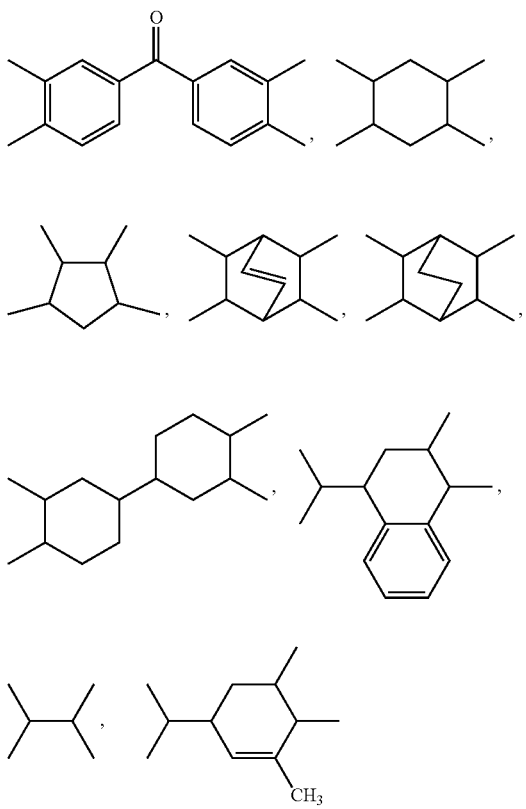

[Invention 12]

The production method according to any one of Inventions 9 to 11, in which the polyimide has a weight average molecular weight of equal to or more than 1,000 and equal to or less than 1,000,000.

[Invention 13]

The production method according to any one of Inventions 9 to 12, in which the step of polycondensing the aromatic diamine represented by General Formula [2A] with the tetracarboxylic dianhydride represented by General Formula [17] to obtain a polyimide represented by General Formula [18] includes a step of reacting the aromatic diamine represented by General Formula [2A] with the tetracarboxylic dianhydride represented by General Formula [17] to obtain a polyamide acid having a repeating unit represented by General Formula [19]; and a step of dehydrating and ring-closing the polyamide acid represented by General Formula [19] to be converted into a polyimide represented by General Formula [18].

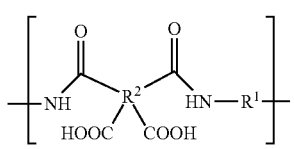

[19]

[In General Formula [19], $R^1$ has the same definition as $R^1$ in General Formula [18], and $R^2$ has the same definition as $R^2$ in General Formula [17].]

[Invention 14]

1,1,1-trifluoro-2,2-bisarylethane represented by Formula [3]:

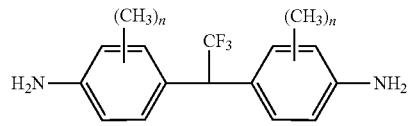

[3]

[In Formula [3], n represents an integer of 1 to 4.]

[Invention 15]

The 1,1,1-trifluoro-2,2-bisarylethane according to Invention 14, which is 1,1,1-trifluoro-2,2-bis(3-methyl-4-aminophenyl)ethane represented by Formula [3a]:

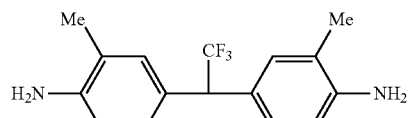

[3a]

[In the formula, Me represents a methyl group.]

[Invention 16]

The 1,1,1-trifluoro-2,2-bisarylethane according to Invention 14, which is 1,1,1-trifluoro-2,2-bis(2-methyl-4-aminophenyl)ethane represented by Formula [3b]:

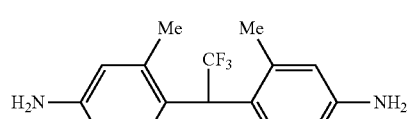

[3b]

[In the formula, Me represents a methyl group.]

[Invention 17]

The 1,1,1-trifluoro-2,2-bisarylethane according to Invention 14, which is 1,1,1-trifluoro-2,2-bis(3,5-dimethyl-4-aminophenyl)ethane represented by Formula [4a]:

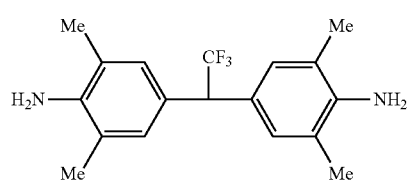

[4e]

[In the formula, Me represents a methyl group.]

[Invention 18]

The 1,1,1-trifluoro-2,2-bisarylethane according to Invention 14, which is 1,1,1-trifluoro-2,2-bis(2,3-dimethyl-4-aminophenyl)ethane represented by Formula [4b]:

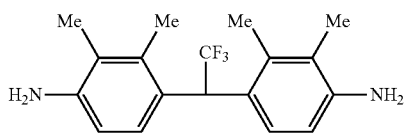

[4b]

[In the formula, Me represents a methyl group.]

[Invention 19]

The 1,1,1-trifluoro-2, -bisarylethane according to Invention 14, which is 1,1,1-trifluoro-2,2-bis(2,5-dimethyl-4-aminophenyl)ethane represented by Formula [4c]:

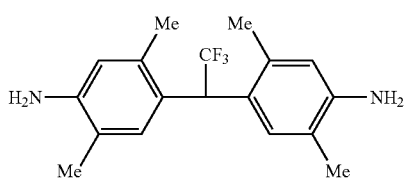

[4c]

[In the formula, Me represents a methyl group.]

[Invention 20]

1,1,1-trifluoro-2,2-bisarylethane represented by Formula [5]:

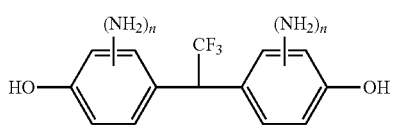

[5]

[In Formula [5], n represents an integer of 1 to 4.]

[Invention 21]

The 1,1,1-trifluoro-2,2-bisarylethane according to Invention 20, which is 1,1,1-trifluoro-2,2-bis(3-amino-4-hydroxyphenyl)ethane represented by Formula [5a]:

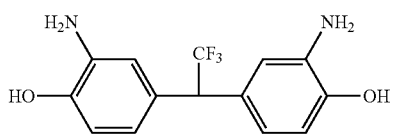 [SMILES: Nc1cc(C(c2ccc(O)c(N)c2)C(F)(F)F)ccc1O]

[Invention 22]

1,1,1-trifluoro-2,2-bisarylethane represented by Formula [6](provided that, excluding the following compounds):

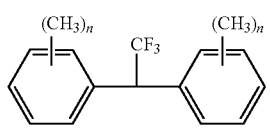

[6]

[In Formula [6], n represents an integer of 1 to 5.]

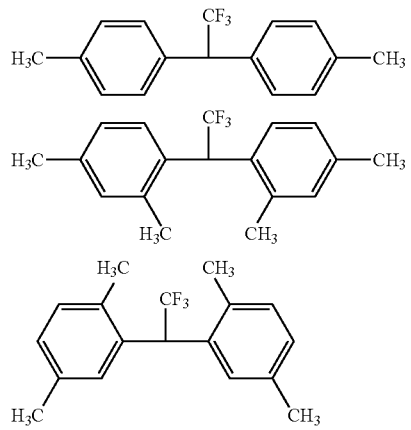

[Invention 23]

The 1,1,1-trifluoro-2,2-bisarylethane according to Invention 22, which is 1,1,1-trifluoro-2,2-bis(3,4-dimethylphenyl)ethane represented by Formula [6a]:

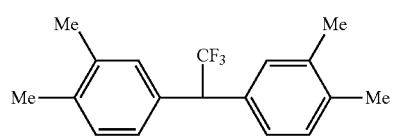

[6a]

[In the formula, Me represents a methyl group.]

[Invention 24]

1,1,1-trifluoro-2,2-bisarylethane represented by Formula [7](provided that, excluding the following compounds):

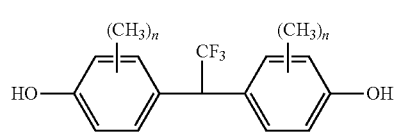

[7]

[In Formula [7], n represents an integer of 1 to 4.]

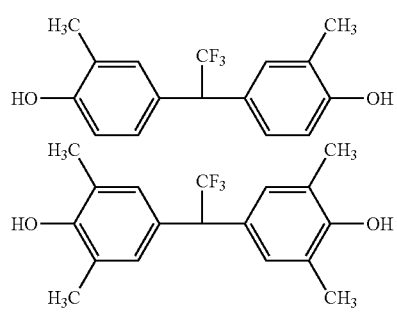

[Invention 25]

The 1,1,1-trifluoro-2,2-bisarylethane according to Invention 24, which is 1,1,1-trifluoro-2,2-bis(2,5-dimethyl-4-hydroxyphenyl)ethane represented by Formula [7a]:

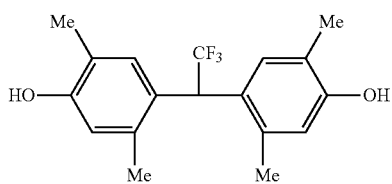

[In the formula, Me represents a methyl group.]

[Invention 26]

1,1,1-trifluoro-2,2-bis(3-methoxy-4-hydroxyphenyl)ethane represented by Formula [8]:

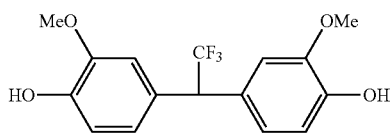

[In the formula, Me represents a methyl group.]

[Invention 27]

1,1,1-trifluoro-2,2-bisarylethane represented by Formula [11]:

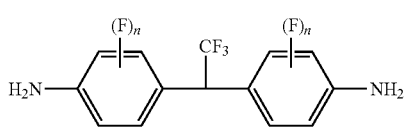

[In Formula [11], n represents an integer of 1 to 4.]

[Invention 28]

The 1,1,1-trifluoro-2,2-bisarylethane according to Invention 27, which is 1,1,1-trifluoro-2,2-bis(3-fluoro-4-aminophenyl)ethane represented by Formula [11a]:

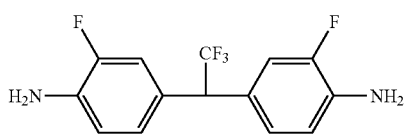

[Invention 29]

The 1,1,1-trifluoro-2,2-bisarylethane according to Invention 27, which is 1,1,1-trifluoro-2,2-bis(2-fluoro-4-aminophenyl)ethane represented by Formula [11b]:

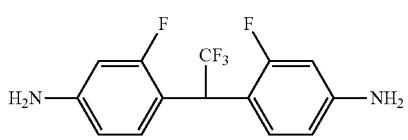

[Invention 30]

1,1,1-trifluoro-2,2-bisarylethane represented by Formula [12]:

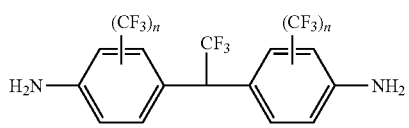

[In Formula [12], n represents an integer of 1 to 4.]

[Invention 31]

The 1,1,1-trifluoro-2,2-bisarylethane according to Invention 30, which is 1,1,1-trifluoro-2,2-bis(3-trifluoromethyl-4-aminophenyl)ethane represented by Formula [12a]:

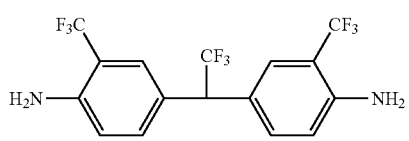

[Invention 32]

1,1,1-trifluoro-2,2-bisarylethane represented by Formula [13]:

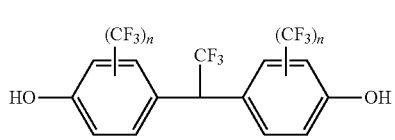

[In Formula [13], n represents an integer of 1 to 4.]

[Invention 33]

The 1,1,1-trifluoro-2,2-bisarylethane according to Invention 32, which is 1,1,1-trifluoro-2,2-bis(3-trifluoromethyl-4-hydroxyphenyl)ethane represented by Formula [13a]:

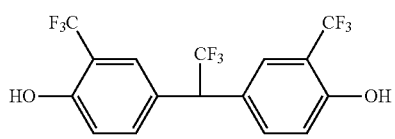

[Invention 34]

1,1,1-trifluoro-2,2-bisarylethane represented by Formula [14]:

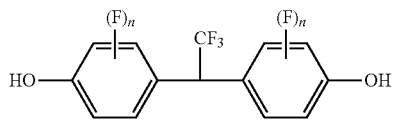

[In Formula [14], n represents an integer of 1 to 4.]

[Invention 35]

The 1,1,1-trifluoro-2,2-bisarylethane according to Invention 34, which is 1,1,1-trifluoro-2,2-bis(3-fluoro-4-hydroxyphenyl)ethane represented by Formula [14a]:

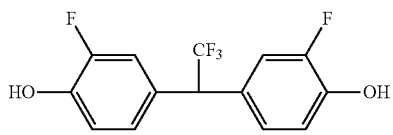

[14a]

[Invention 36]

1,1,1-trifluoro-2,2-bis(3-nitro-4-hydroxyphenyl)ethane represented by Formula [15]:

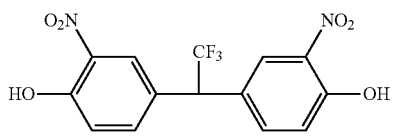

[15]

[Invention 37]

1,1,1-trifluoro-2,2-bis(3-trifluoromethyl-4-hydroxyphenyl) ethane represented by Formula [16]:

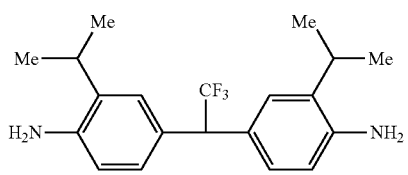

[16]

Advantageous Effects of Invention

According to the present invention, there is an effect that 1,1,1-trifluoro-2,2-bisarylethane can be efficiently produced from anhydrous fluoral, which is inexpensive and highly reactive, by a simple operation.

DESCRIPTION OF EMBODIMENTS

Hereinafter, the present invention will be described in detail. The present invention is not limited to the following embodiments, and can be appropriately carried out based on the ordinary knowledge of those skilled in the art without departing from the scope and spirit of the present invention.

The 1,1,1-trifluoro-2,2-bisarylethane having one trifluoromethyl group according to the present invention is obtained by reacting a mixture of fluoral/hydrogen fluoride with an aryl compound represented by General Formula [1], as shown in the following reaction formula.

[Scheme 1]

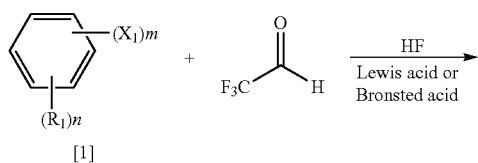

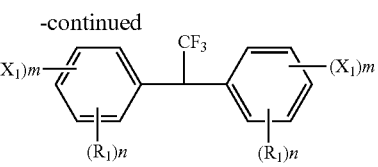

[2]

For the preparation of fluoral as a starting material used in the present invention, a hydrate of a commercially available product (manufactured by Tokyo Chemical Industry Co., Ltd.) or a fluoral hemiacetal can be used as an equivalent thereof. On the other hand, a fluoral hydrate or a fluoral hemiacetal can be prepared by the method described in documents such as Japanese Unexamined Patent Publication No. H05-97757.

In general, fluoral is often used as a hydrate or hemiacetal, so in a case where fluoral is used under anhydrous conditions as in the present invention, anhydrous fluoral can be prepared by dehydrating a fluoral hydrate or hemiacetal. On the other hand, as described in Japanese Unexamined Patent Publication No. H03-184933, it is possible to convert chloral into fluoral almost quantitatively by a catalytic vapor phase fluorination reaction of inexpensive chloral, and by using this, anhydrous fluoral can also be prepared (Preparation Example 1).

Fluoral, which is the starting material of the present invention, is a low boiling point compound, which is generally highly self-reactive and difficult to handle. However, in the present step, it has been newly found that fluoral can be handled very stably in a hydrogen fluoride solution. In a case where fluoral is handled in hydrogen fluoride, 1,2,2,2-tetrafluoroethanol, which is an adduct consisting of fluoral and hydrogen fluoride, is produced as shown in the scheme below (Preparation Example 1).

[Scheme 2]

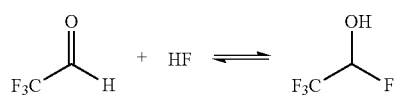

As described above, it is presumed that 1,2,2,2-tetrafluoroethanol is in an equilibrium state due to the formation of an equilibrium state between the fluoral and the adduct, and the excessive presence of hydrogen fluoride in the system, and as a result, the decomposition of fluoral is suppressed. The above-mentioned fluoral in hydrogen fluoride has been confirmed not only to improve the stability of the compound but also to increase the boiling point of the compound, and therefore fluoral, which is a low boiling point compound even near room temperature, can be easily handled as an adduct of hydrogen fluoride.

In a case where the prepared fluoral is handled as a mixture with hydrogen fluoride, the amount of hydrogen fluoride added is usually 0.1 to 100 mol, preferably 1 to 75 mol, and more preferably 2 to 50 mol with respect to 1 mol of the prepared fluoral. In a case where the amount of hydrogen fluoride added is less than 0.1 mol, a sufficient stabilizing effect cannot be obtained, which is not preferable. In addition, the same stabilizing effect can be expected even in a case where 100 mol or more of hydrogen fluoride is added, but it is not preferable from the viewpoint of productivity and economy. In addition, the fluoral/hydrogen fluoride mixture used in the present step may contain an excess amount of hydrogen fluoride, but due to having a function as an acidic substance possessed by hydrogen fluoride itself, the hydrogen fluoride can be used as an additive that effectively acts as an acid catalyst or a dehydrating agent to accelerate the reaction. Therefore, it can be said that there is an advantage of being handled as a mixture of raw material fluoral/hydrogen fluoride.

$X_1$ in the aryl compound represented by General Formula [1] is not limited as long as it is a substituent capable of inducing a functional monomer, but $X_1$'s each independently represent a hydroxyl group, an amino group, a carboxyl group, and a halogen atom. Of these, a hydroxyl group and an amino group are preferable. The number (m) of $X_1$'s bonded to the aryl compound is an integer of 0 to 3 and preferably an integer of 1 to 2.

$R_1$'s in the aryl compound represented by General Formula [1] each independently represent a monovalent organic group. The monovalent organic group is not limited and preferred examples thereof include an alkyl group, an alkoxy group, a cycloalkyl group, an aryl group, an alkenyl group, an alkynyl group, an aryloxy group, an amino group, an alkylamino group, an arylamino group, a cyano group, a nitro group, a silyl group, and a halogeno group (for example, a fluoro group), each of which may have a substituent such as a fluorine atom or a carboxyl group, among which an alkyl group, an alkoxy group, a fluorinated alkyl group (for example, a trifluoromethyl group), a halogeno group (for example, a fluoro group), and a nitro group are more preferable. The alkyl group as $R_1$ is not limited, but is preferably a linear or branched alkyl group having 1 to 6 carbon atoms, among which an n-butyl group, an s-butyl group, an isobutyl group, a t-butyl group, an n-propyl group, an i-propyl group, an ethyl group, and a methyl group are preferable, and an ethyl group and a methyl group are particularly preferable. On the other hand, the alkoxy group as $R_1$ is not limited, but is preferably a linear or branched alkoxy group having 1 to 6 carbon atoms, among which an n-butoxy group, an s-butoxy group, an isobutoxy group, a t-butoxy group, an n-propoxy group, an i-propoxy group, an ethoxy group, and a methoxy group are preferable, and an ethoxy group and a methoxy group are particularly preferable. In addition, the alkyl group or alkoxy group may be one in which, for example, a halogen atom, an alkoxy group, and a haloalkoxy group are substituted on any carbon thereof in any number and in any combination. Furthermore, in a case where the number of $R_1$'s in the aryl compound is 2 or more, these 2 or more $R_1$'s may be linked to form a saturated or unsaturated monocyclic or polycyclic cyclic group having 3 to 10 carbon atoms. The number (n) of $R_1$'s bonded to the aryl compound is an integer of 0 to (5−m) and preferably an integer of 0 to 2.

The amount of the aryl compound to be used may be equal to or more than 1 mol with respect to 1 mol of fluoral; is usually preferably 2 to 10 mol because the reaction proceeds smoothly; and is particularly preferably 2 to 5 mol in consideration of a post-treatment operation.

The present invention can be carried out in the presence of a reaction solvent. Examples of the reaction solvent include aliphatic hydrocarbons, aromatic hydrocarbons, halogenated hydrocarbons, ethers, esters, amides, nitriles, and sulfoxides. Specific examples of the reaction solvent include n-hexane, cyclohexane, n-heptane, benzene, toluene, ethylbenzene, xylene, mesitylene, methylene chloride, chloroform, 1,2-dichloroethane, diethyl ether, tetrahydrofuran, diisopropyl ether, tert-butylmethyl ether, ethyl acetate, n-butyl acetate, N,N-dimethylformamide, N,N-dimethylacetamide, N-methylpyrrolidone, 1,3-dimethyl-2-imidazolidinone, acetonitrile, propionitrile, and dimethyl sulfoxide. These reaction solvents can be used alone or in combination.

The present invention can also carry out the reaction without using a solvent. As disclosed in Examples which will be described later, it is more preferable to carry out the reaction without a solvent because there are advantages that a purification operation after the reaction becomes simple and a high-purity target product can be obtained only by a simple purification operation.

In the present step, adding a Lewis acid or Bronsted acid to the reaction system together with a fluoral/hydrogen fluoride mixture and an aryl compound can improve the conversion rate of the condensation reaction in the present invention, and thus is mentioned as one of the preferred aspects in the present invention.

The Lewis acid used in the present step is a metal halide containing at least one metal selected from the group consisting of boron (III: oxidation number; the same shall apply hereinafter in the present specification), tin (II), tin (IV), titanium (IV), zinc (II), aluminum (III), antimony (III), and antimony (V). As the metal halide used, a halide of a metal having a maximum possible valence is preferable.

Among the metal halides using these metals, boron (III) trifluoride, aluminum (III) trichloride, zinc (II) dichloride, titanium (IV) tetrachloride, tin (IV) tetrachloride, and antimony (V) pentachloride are particularly preferred.

In order to make Lewis acid function as an additive, it is preferably used in an amount of equal to or more than 0.001 mol and usually 0.01 to 2.0 mol with respect to 1 mol of fluoral. However, Lewis acid is economically not preferable in a case of being used in an amount greater than 2.0 equivalents.

The Bronsted acid used in the present step is an inorganic acid or an organic acid. Specific examples of the inorganic acid include phosphoric acid, hydrogen chloride, hydrogenbromide, concentrated nitric acid, concentrated sulfuric acid, fuming nitric acid, and fuming sulfuric acid. Specific examples of the organic acid include formic acid, acetic acid, oxalic acid, benzoic acid, methanesulfonic acid, benzenesulfonic acid, paratoluenesulfonic acid, and trifluoromethanesulfonic acid.

In order to make Bronsted acid function as an additive, it is preferably used in an amount of equal to or more than 0.001 mol and usually 0.01 to 2.0 mol with respect to 1 mol of fluoral. However, Bronsted acid is economically not preferable in a case of being used in an amount greater than 2.0 equivalents.

The temperature condition may be in a range of −20° C. to +200° C., and is usually preferably −10° C. to +180° C. and particularly preferably 0° C. to +160° C.

The pressure condition may be in a range of atmospheric pressure to 4.0 MPa (absolute pressure; the same shall apply hereinafter), and is usually preferably atmospheric pressure to 2.0 MPa and particularly more preferably atmospheric pressure to 1.5 MPa. As the reaction container for use in the present invention, a reactor capable of carrying out a sufficient reaction under normal pressure or under pressure can be used, such as a container made of a metal such as stainless steel, Monel™, Hastelloy™, or nickel; or a container in which a tetrafluoroethylene resin, a chlorotrifluoroethylene resin, a vinylidene fluoride resin, a PFA resin, a propylene resin, a polyethylene resin, or the like is lined inside.

The reaction time is usually within 24 hours, but it varies depending on the combination of the fluoral/hydrogen fluoride mixture and the aryl compound and the difference in reaction conditions due to the amount of the additives Lewis acid and Bronsted acid used. It is preferable that the progress of the reaction is tracked by an analytical technique such as gas chromatography, thin layer chromatography, liquid chromatography, or nuclear magnetic resonance, and the end point of the reaction is the time in a case where the starting substrate is almost eliminated.

The post-treatment after the reaction involves a normal purification operation on the reaction-completed solution. For example, the reaction-completed solution is poured into water or an aqueous solution of an alkali metal inorganic base (for example, sodium hydroxide, potassium hydroxide, sodium hydrogen carbonate, potassium hydrogen carbonate, sodium carbonate, or potassium carbonate) and extracted with an organic solvent (for example, ethyl acetate, toluene, mesitylene, or methylene chloride), whereby a target simple substance of 1,1,1-trifluoro-2,2-bisarylethane represented by General Formula [2] can be easily obtained. The target product can be purified to a higher chemical purity product by activated carbon treatment, distillation, recrystallization, column chromatography or the like, if necessary.

By the production method of the present embodiment, 1,1,1-trifluoro-2,2-bisarylethane represented by Formula [1] can be produced with high isomer selectivity. Among the compounds represented by Formula [1], for example, the compound represented by Formula [3], the compound represented by Formula [5], the compound represented by Formula [6], the compound represented by Formula [7], the compound represented by Formula [8], the compound represented by Formula [11], the compound represented by Formula [12], the compound represented by Formula [13], the compound represented by Formula [14], the compound represented by Formula [15], and the compound represented by Formula [16] can be produced in high yield with particularly high isomer selectivity using the method of the present embodiment. In the following formulae, "n" represents an integer of 1 to 5, and "Me" represents a methyl group.

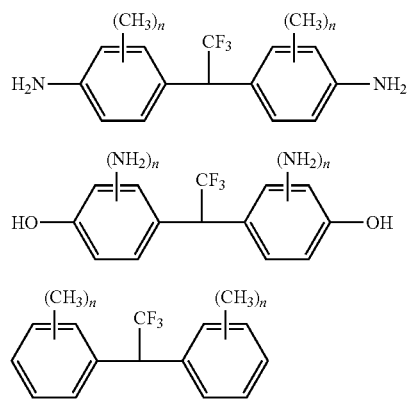

(Provided that, the following compounds are excluded from the compounds of Formula [6]):

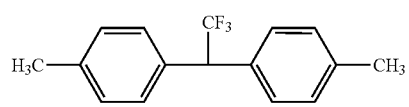

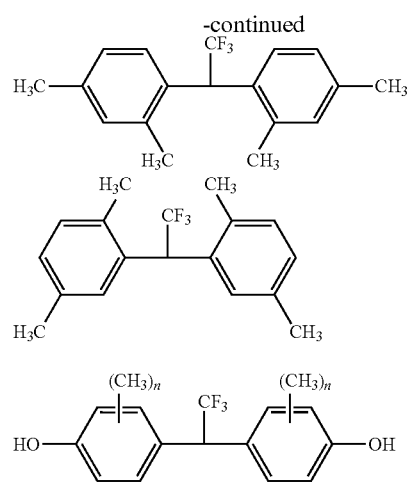

(Provided that, the following compounds are excluded from the compounds of Formula [7]):

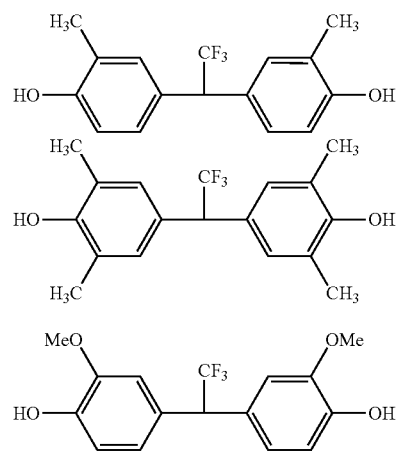

[In the formula, Me represents a methyl group.]

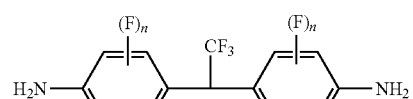

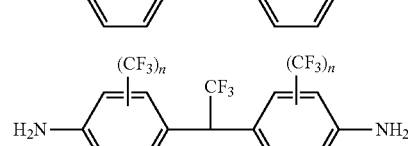

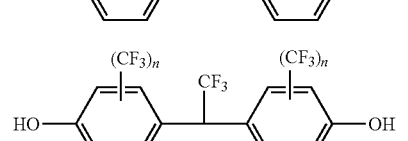

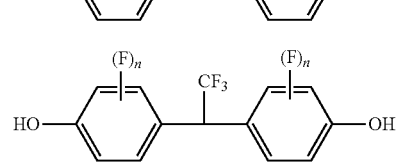

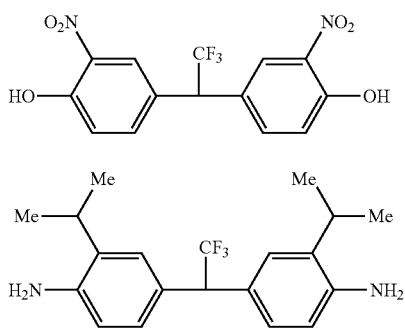

Among the compounds represented by Formula [3], 1,1,1-trifluoro-2,2-bis(3-methyl-4-aminophenyl)ethane represented by Formula [3a], 1,1,1-trifluoro-2,2-bis(2-methyl-4-aminophenyl)ethane represented by Formula [3b], 1,1,1-trifluoro-2,2-bis(3,5-dimethyl-4-aminophenyl)ethane represented by Formula [4a], 1,1,1-trifluoro-2,2-bis(2,3-dimethyl-4-aminophenyl)ethane represented by Formula [4b], and 1,1,1-trifluoro-2,2-bis(2,5-dimethyl-4-aminophenyl)ethane represented by Formula [4c] can be produced in high yield by the method of the present embodiment. In the following formulae, "Me" represents a methyl group.

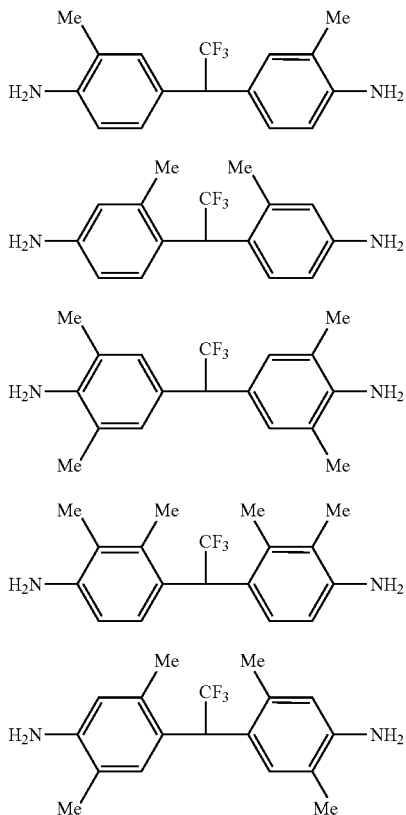

Among the compounds represented by Formula [5], 1,1,1-trifluoro-2,2-bis(3-amino-4-hydroxyphenyl)ethane represented by Formula [5a] can be produced in high yield by the method of the present embodiment.

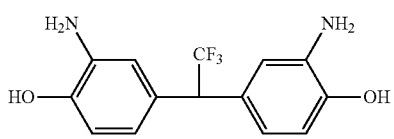

Among the compounds represented by Formula [6], 1,1,1-trifluoro-2,2-bis(3,4-dimethylphenyl)ethane represented by Formula [6a] can be produced in high yield by the method of the present embodiment. In the following formula, "Me" represents a methyl group.

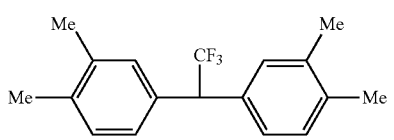

Among the compounds represented by Formula [7], 1,1,1-trifluoro-2,2-bis(2,5-dimethyl-4-hydroxyphenyl)ethane represented by Formula [7a] can be produced in high yield by the method of the present embodiment. In the following formula, "Me" represents a methyl group.

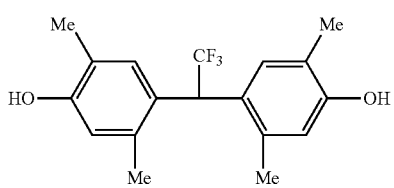

Among the compounds represented by Formula [11], 1,1,1-trifluoro-2,2-bis(3-fluoro-4-aminophenyl)ethane represented by Formula [11a], and 1,1,1-trifluoro-2,2-bis(2-fluoro-4-aminophenyl)ethane represented by Formula [11b] can be produced in high yield by the method of the present embodiment.

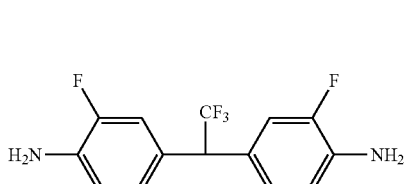

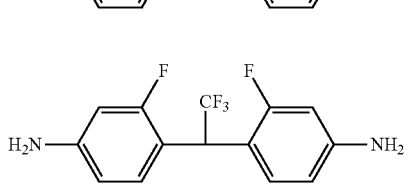

Among the compounds represented by Formula [12], 1,1,1-trifluoro-2,2-bis(3-trifluoromethyl-4-aminophenyl)ethane represented by Formula [12a] can be produced in high yield by the method of the present embodiment.

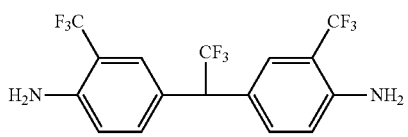
[12a]

Among the compounds represented by Formula [13], 1,1,1-trifluoro-2,2-bis(3-trifluoromethyl-4-hydroxyphenyl) etha ne represented by Formula [13a] can be produced in high yield by the method of the present embodiment.

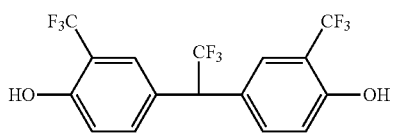
[13a]

Among the compounds represented by Formula [14], 1,1,1-trifluoro-2,2-bis(3-fluoro-4-hydroxyphenyl)ethane represented by Formula [14a] can be produced in high yield by the method of the present embodiment.

[Method for Producing Polyimide and Polyamide Acid (Polyamic Acid)]

Of the 1,1,1-trifluoro-2,2-bisarylethane represented by General Formula [2] obtained by the method of the present embodiment, the aromatic diamine represented by General Formula [2A] reacts with the tetracarboxylic dianhydride represented by the tetracarboxylic dianhydride represented by General Formula [17] to afford a polyimide having the repeating unit represented by General Formula [18], which is excellent in transparency and heat resistance and also excellent in film forming processability.

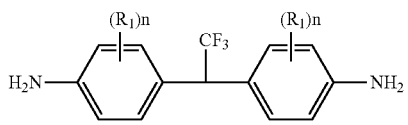
[2A]

[In General Formula [2A], n is an integer of 0 to 4, and $R_1$'s each independently represent a monovalent organic group.]

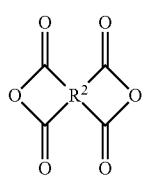
[17]

[In General Formula [17], $R^2$ is a tetravalent organic group.]

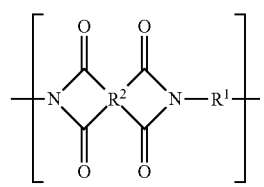
[18]

[In General Formula [18], $R^1$ is a divalent organic group represented by General Formula [2B], and $R^2$ is a tetravalent organic group]

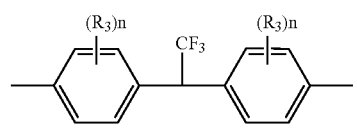
[2B]

[In General Formula [2B], n is an integer of 0 to 4, and $R_3$ has the same definition as $R_1$ in General Formula [2A].]

An example of the method for producing a polyimide is a method in which the aromatic diamine and the tetracarboxylic dianhydride are mutually melted at equal to or higher than 150° C.

Further, another production example is a method for producing the polyimide according to the present embodiment in which the aromatic diamine and the tetracarboxylic dianhydride are polycondensed in an organic solvent, and the obtained polyamide acid represented by General Formula [19] is dehydrated and ring-closed.

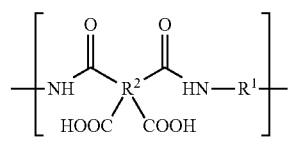
[19]

[In General Formula [19], $R^1$ has the same definition as $R^1$ in General Formula [18], and $R^2$ has the same definition as $R^2$ in General Formula [17].]

This polycondensation reaction is preferably carried out at −20° C. to 80° C., and the diamine and the tetracarboxylic dianhydride are preferably reacted in a molar ratio of 1:1.

$R_1$ in the diamine represented by General Formula [2A] has the same definition as $R_1$ in the aryl compound represented by General Formula [1]. The type of $R_1$ is not limited, but for example, in a case where $R_1$ is an alkyl group, it is preferably a linear or branched alkyl group having 1 to 6 carbon atoms, among which an n-butyl group, an s-butyl group, an isobutyl group, a t-butyl group, an n-propyl group, an i-propyl group, an ethyl group, and a methyl group are preferable, and an ethyl group and a methyl group are particularly preferable.

Here, as examples of the case where $R_1$ is a methyl group, aromatic diamines having the following structure can be mentioned.

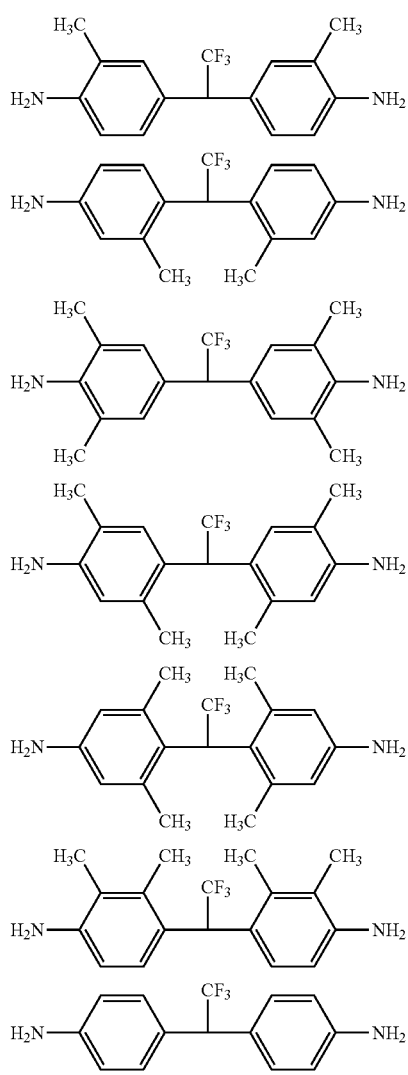
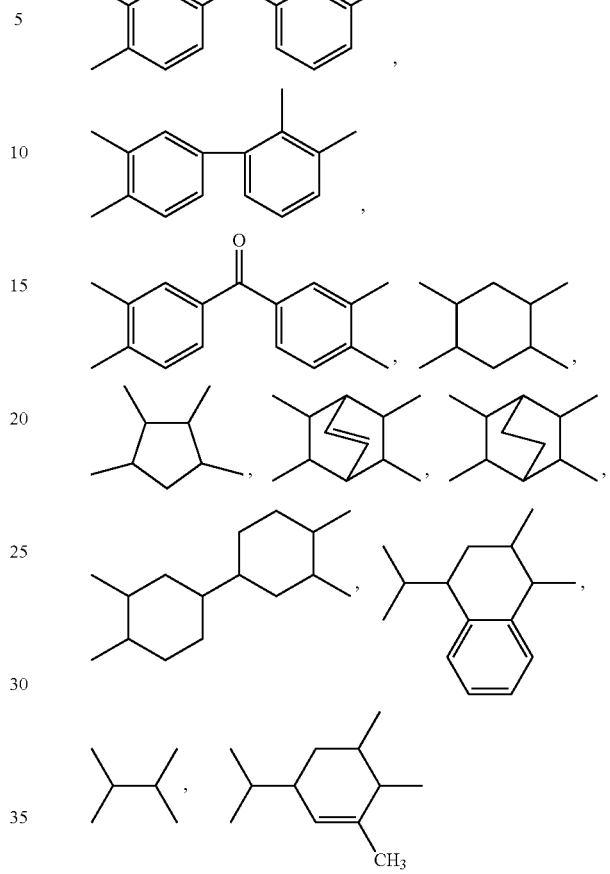
R² of the tetracarboxylic dianhydride represented by General Formula [17] is a tetravalent organic group, examples of which include the following organic groups.
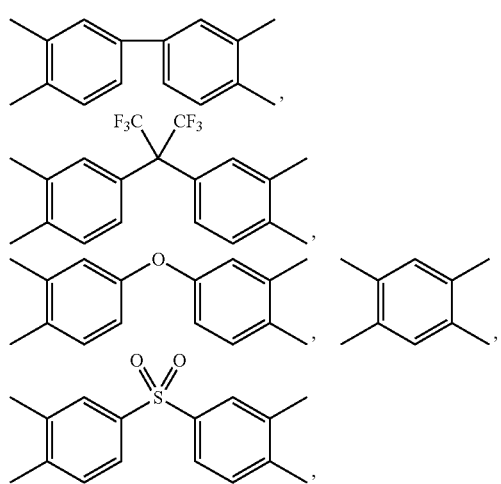
In addition, as a specific compound of a tetracarboxylic dianhydride, compounds having the following structure can be mentioned.
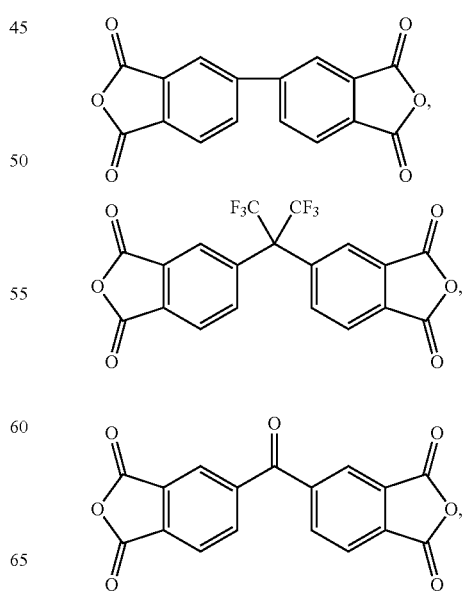

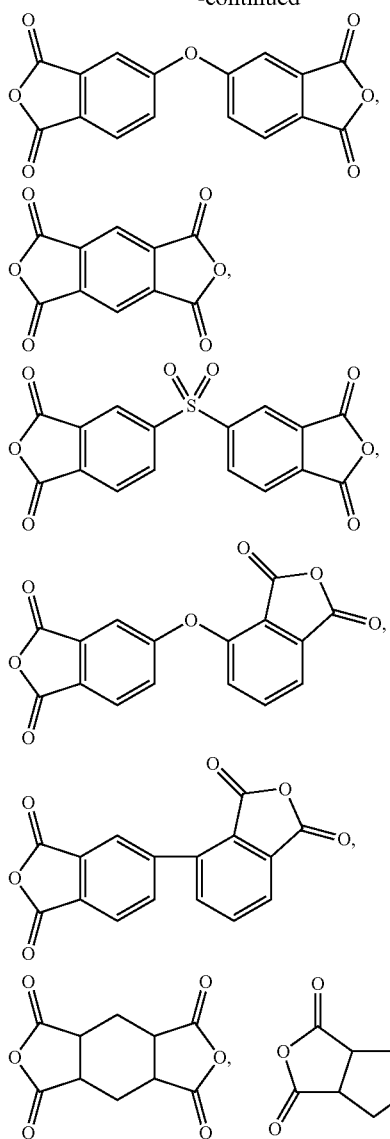
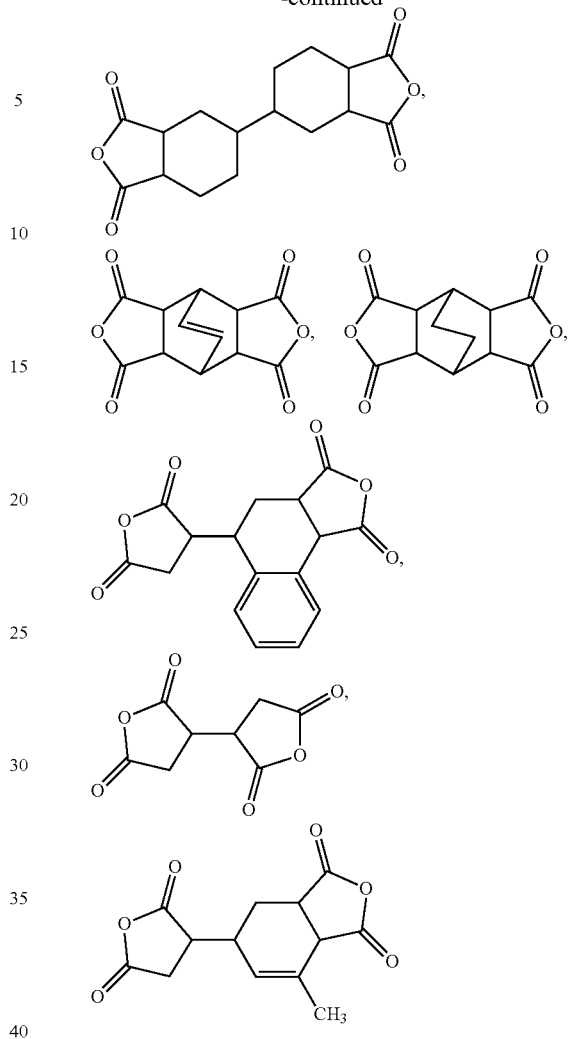
As the polyimide of the present embodiment having the repeating unit represented by General Formula [18], a polyimide having a structural unit represented by any of the following formulae can be mentioned.
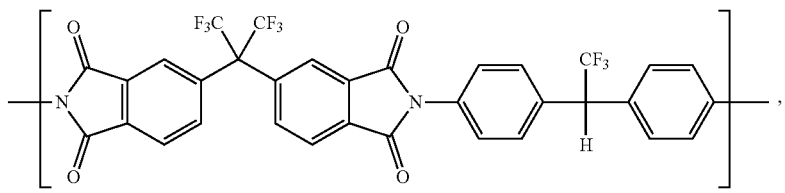
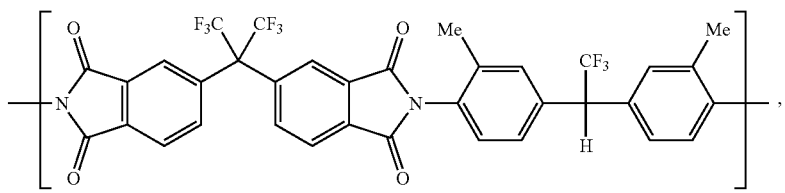

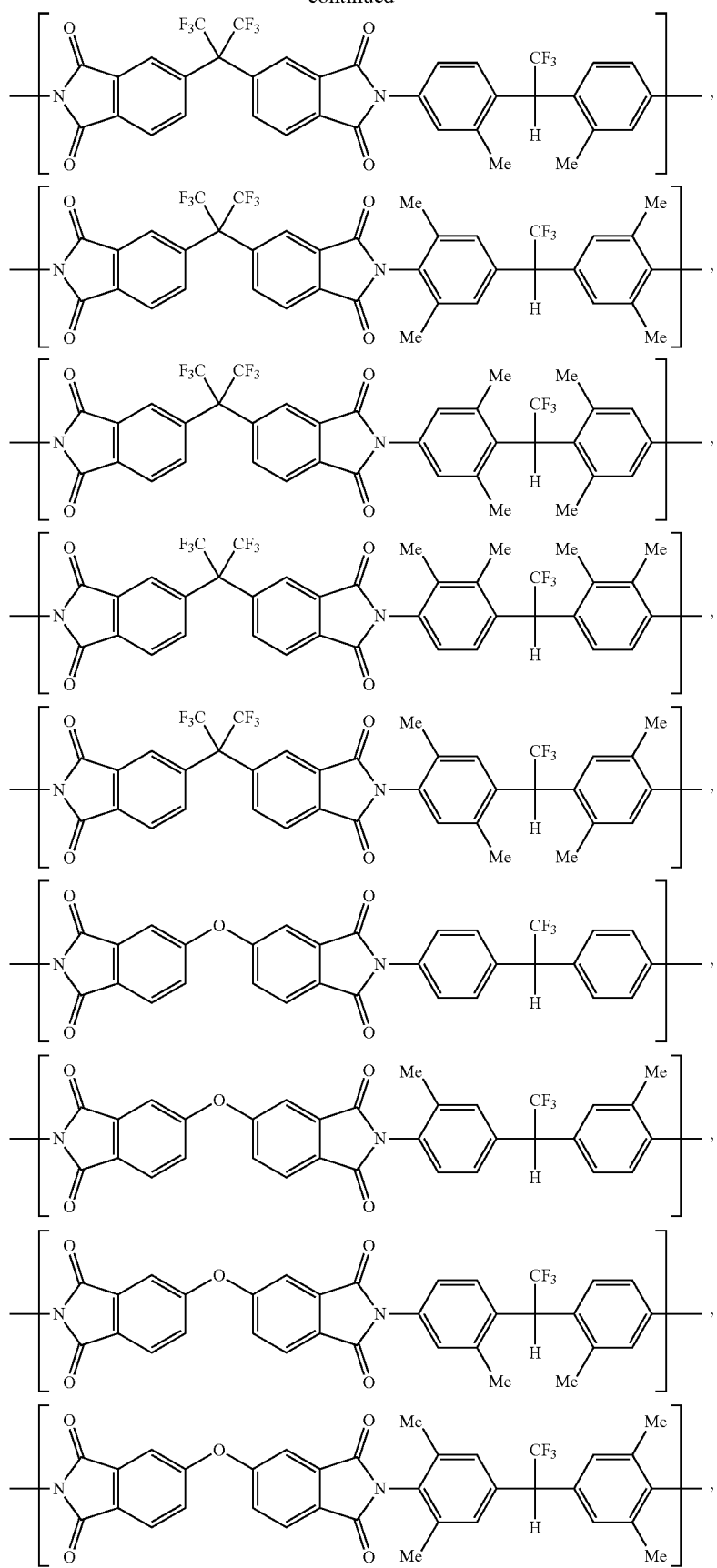

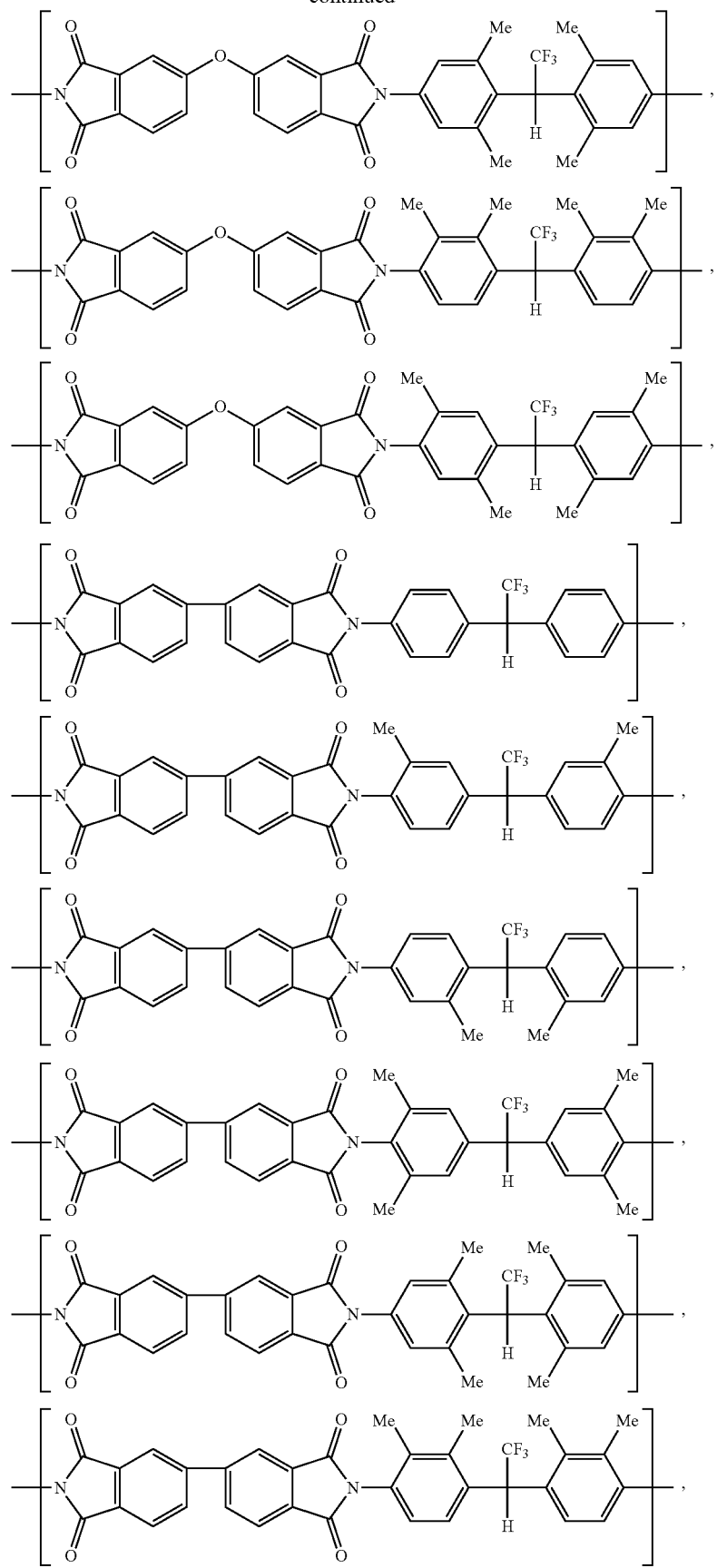

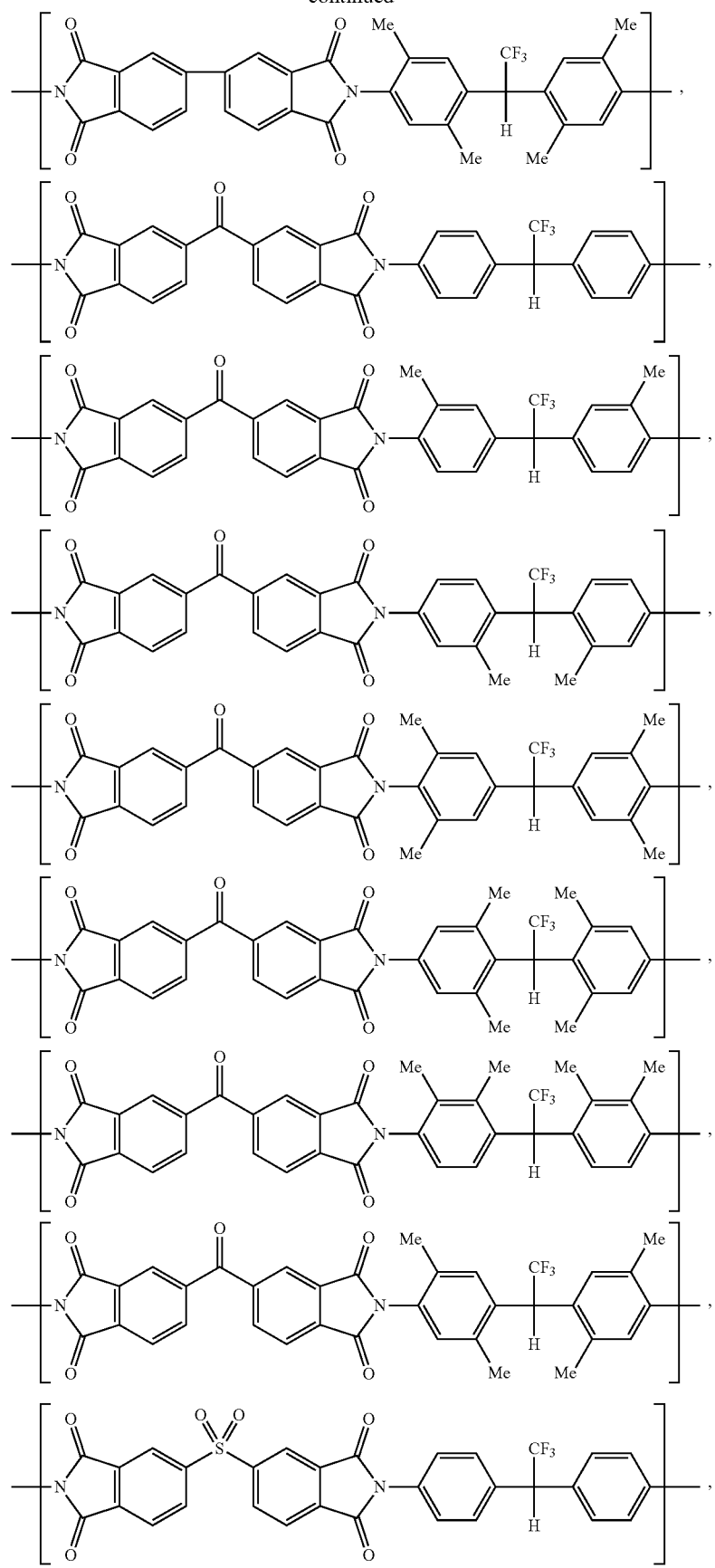

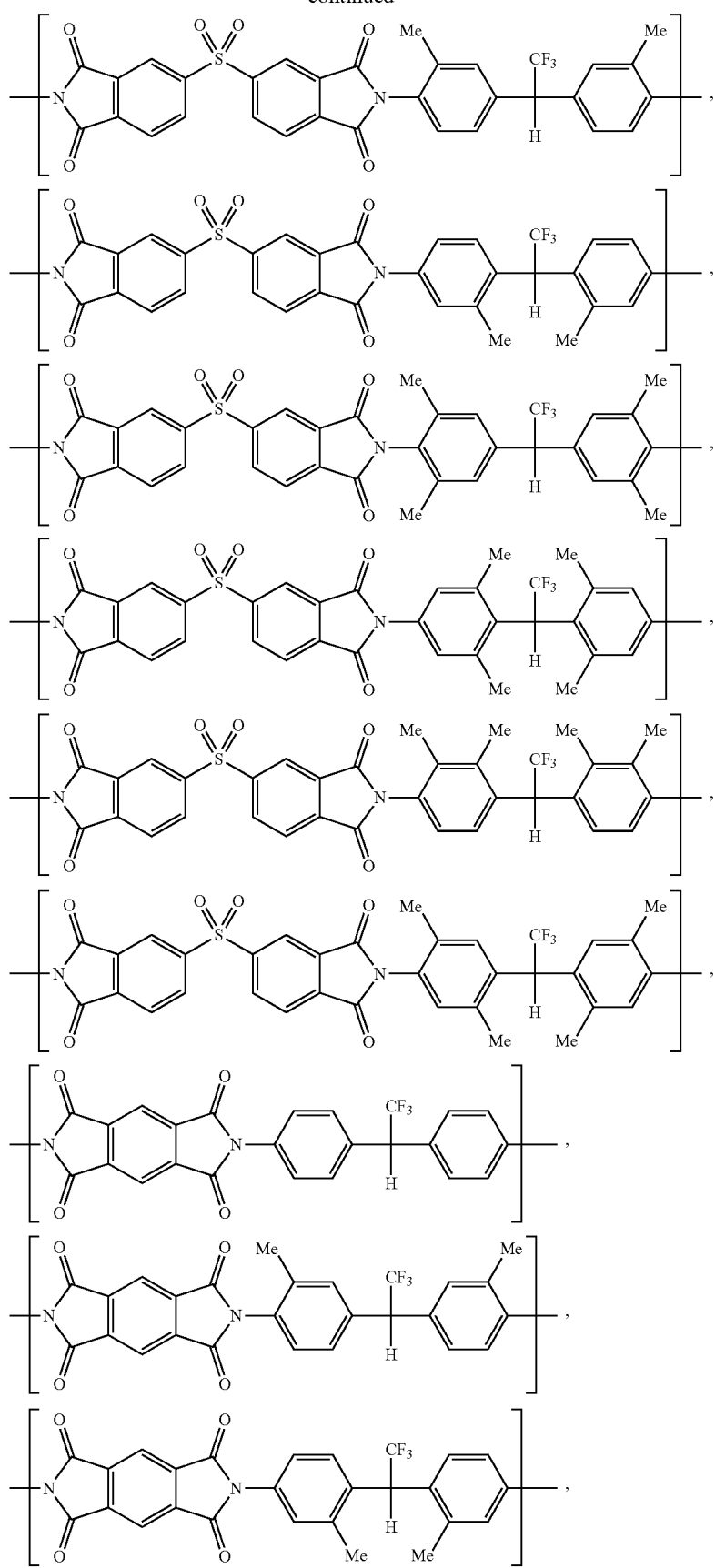

-continued

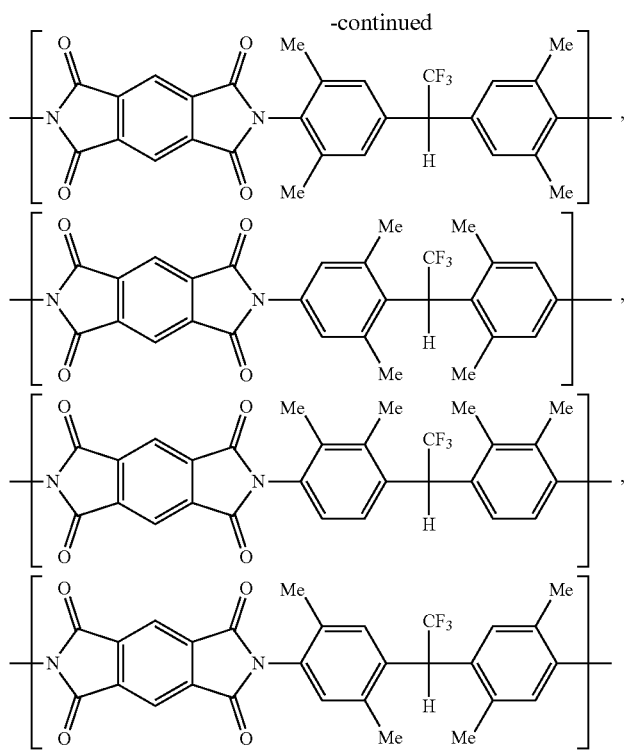

In the polyimide of the present embodiment, the weight average molecular weight thereof is not particularly limited, but the weight average molecular weight of the polyimide is usually equal to or more than 1,000 and equal to or less than 1,000,000 and preferably equal to or more than 30,000 and equal to or less than 200,000. In a case where the weight average molecular weight of the polyimide is less than 1,000 or in a case where the weight average molecular weight of the polyimide is more than 1,000,000, it may affect the performance of the polyimide as a substrate and the state of film formation of the polyimide on the base material. In the present specification, the weight average molecular weight is a value obtained by measuring a sample with gel permeation chromatography (hereinafter, sometimes referred to as "GPC") and calculating the measured value in terms of polystyrene using a standard polystyrene calibration curve.

Examples of other diamine compounds that can be used in combination include o-phenylenediamine, m-phenylenediamine, p-phenylenediamine, 2,4-diaminotoluene, 2,5-diaminotoluene, 4-diamino-m-xylene, 2,4-diaminoxylene, 2,2-bis (4-(4-aminophenyl)hexafluoropropane, and 2,2'-bis (trifluoromethyl)benzidine, from the viewpoint of availability. 2,2-bis(4-(4-aminophenyl)hexafluoropropane), which has less decrease in transparency, is particularly preferable. These compounds may be used alone or in combination of two or more thereof.

The organic solvent that can be used in the polycondensation reaction is not particularly limited as long as the raw material compound is dissolved therein, and examples thereof include an amide-based solvent, an ether-based solvent, an aromatic hydrocarbon-based solvent, a halogen-based solvent, and a lactone-based solvent. Specific examples of the organic solvent include N,N-dimethylformamide, N,N-dimethylacetamide (DMAc), N-methylformamide, hexamethyl phosphoric acid triamide, N-methyl-2-pyrrolidone, diethyl ether, dipropyl ether, diisopropyl ether, dibutyl ether, cyclopentyl methyl ether, diphenyl ether, dimethoxyethane, diethoxyethane, tetrahydrofuran, dioxane, trioxane, benzene, anisole, nitrobenzene, benzonitrile, chloroform, dichloromethane, 1,2-dichloroethane, 1,1,2,2-tetrachloroethane, γ-butyrolactone, γ-valerolactone, ε-valerolactone, γ-caprolactone, ε-caprolactone, and α-methyl-γ-butyrolactone. These organic solvents may be used alone or in combination of two or more thereof.

The polyimide according to the present embodiment (General Formula [18]) can be obtained by further dehydrating and ring-closing the polyamide acid (General Formula [19]) obtained by the polycondensation reaction to be imidized. This dehydration ring closure reaction is carried out under conditions of a heating method, chemical method, or the like that promote cyclization. A solution of the polyimide according to the present embodiment can be obtained by the heating method in which the polyamide acid immediately after polymerization is imidized by heating at a high temperature of 150° C. to 350° C., or by the chemical method in which a base such as pyridine or triethylamine and an acetic anhydride are each added in an amount of equal to or more than 0.1 molar equivalents and less than 10 equivalents at room temperature (0° C. to 50° C.) to a raw material diamine to be imidized. The concentration of polyimide in this solution is preferably equal to or more than 5% by mass and equal to or less than 50% by mass. In a case where the concentration of polyimide is less than 5% by mass, practicality and efficiency may be affected, and in a case where the concentration of polyimide is greater than 50% by mass, solubility may be affected. Further, the concentration of polyimide is preferably equal to or more than 10% by mass and equal to or less than 40% by mass.

As the polyamide acid of the present embodiment having the repeating unit represented by General Formula [19], a polyamide acid having a structural unit represented by any of the following formulae can be mentioned.

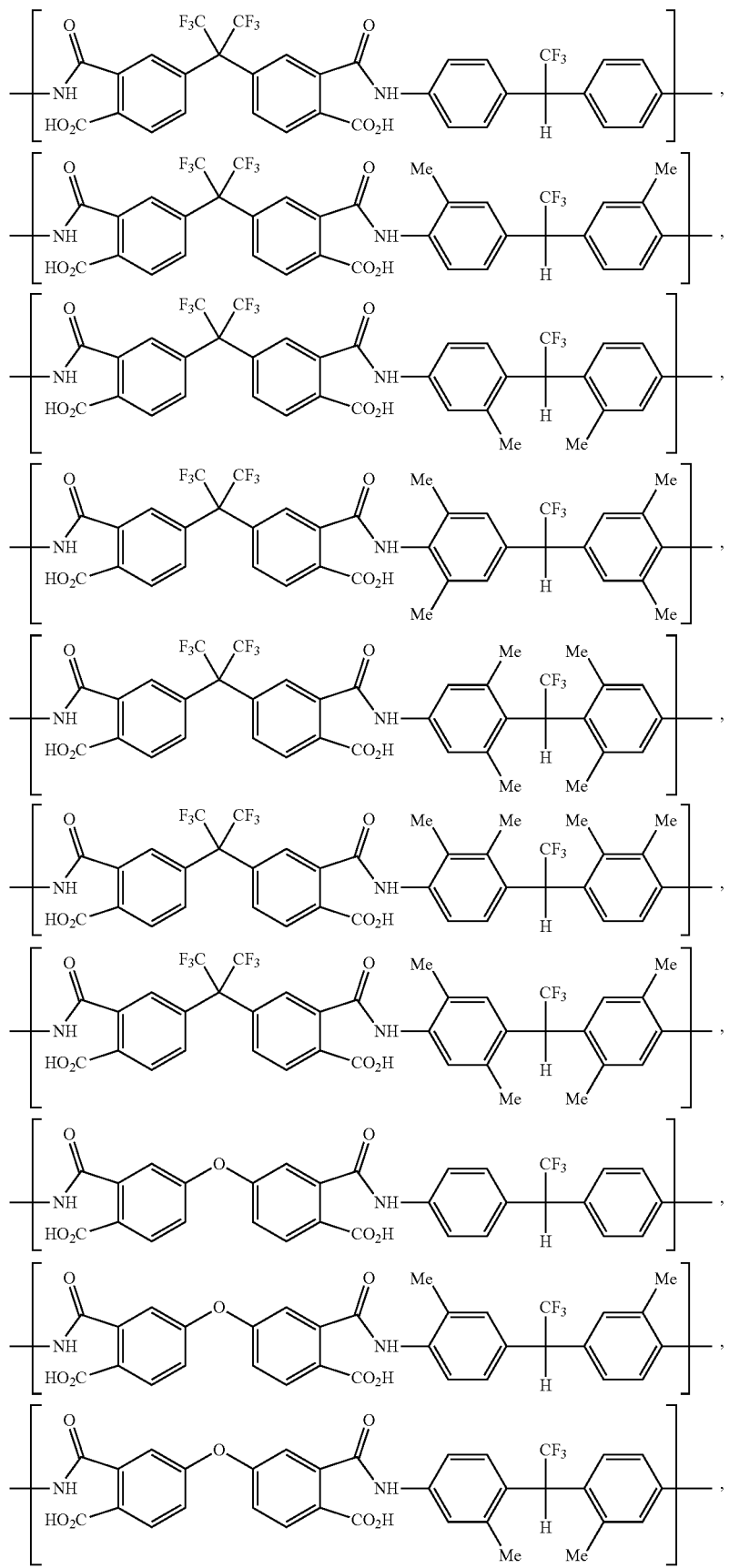

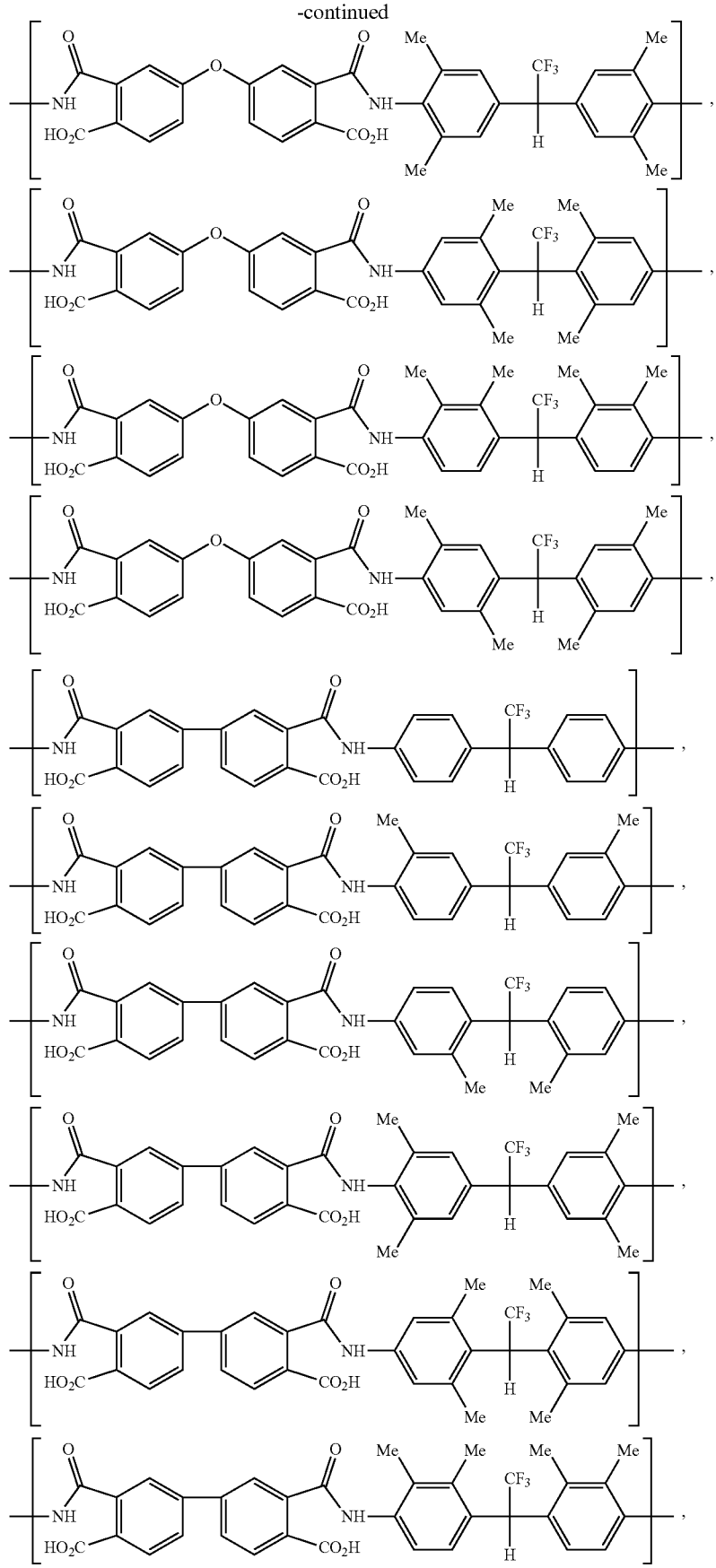

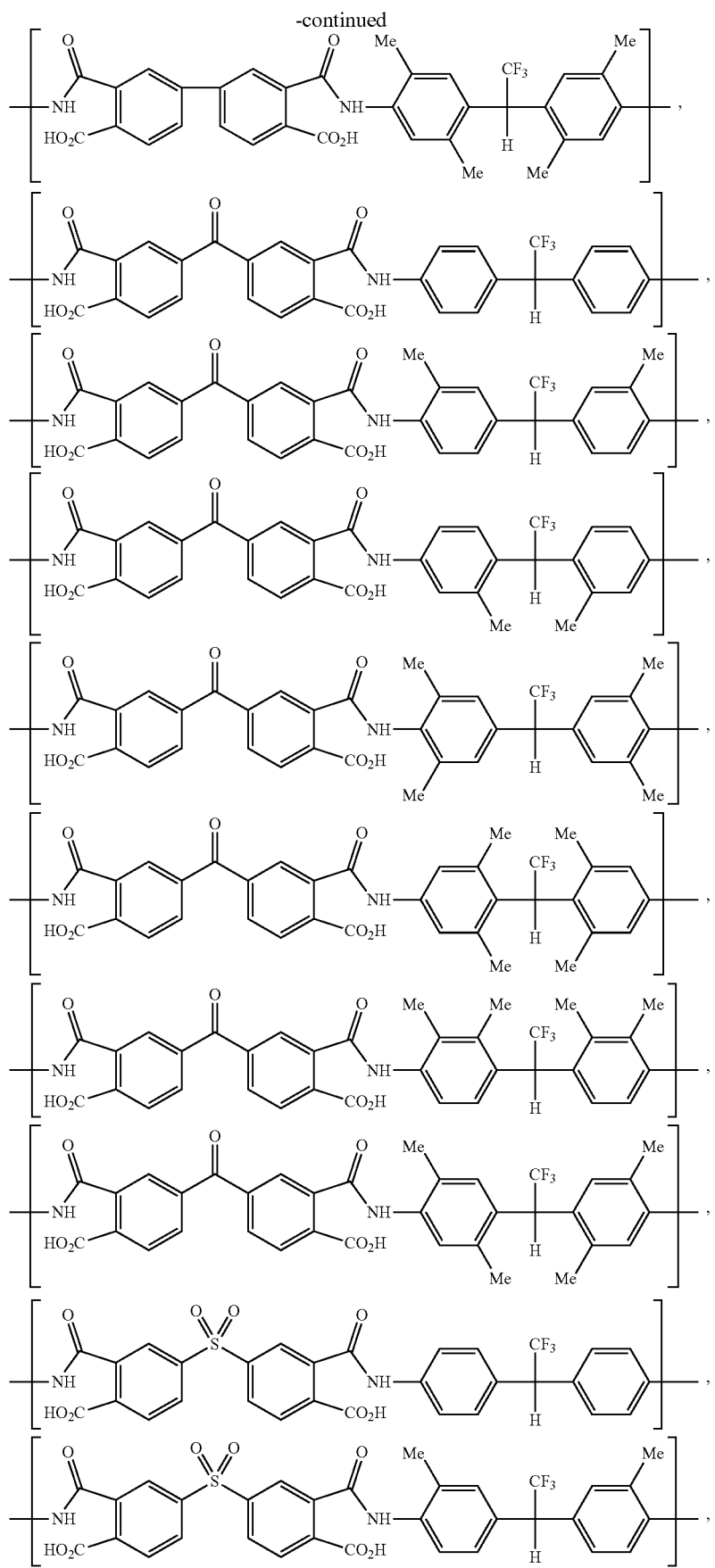

-continued
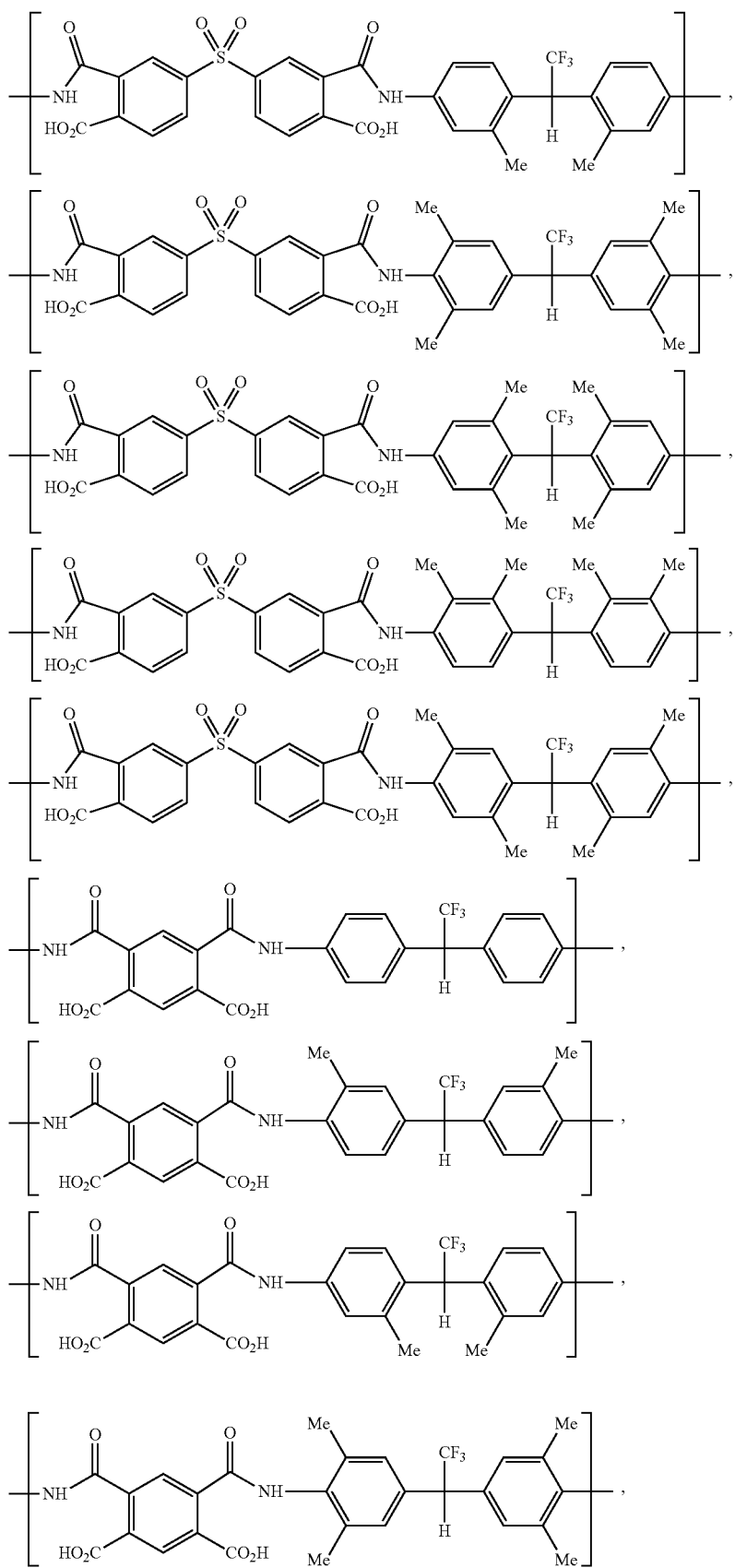

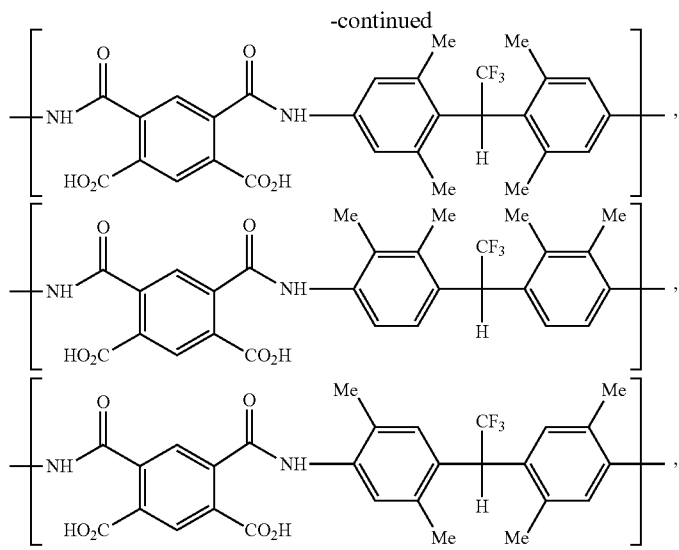

Since the weight average molecular weight of the polyamide acid according to the present embodiment has the same definition as that of the above-mentioned polyimide, the description thereof will not be repeated. In addition, the polyimide and the polyamide acid of the present embodiment may be used alone or may be in admixture of the polyimide and the polyamide acid.

The solution of the polyimide and the polyamide acid according to the embodiment can be used as a raw material in the production of a film or a membrane. For example, for the purpose of removing residual monomers and low molecular weight substances contained in the solution of the polyimide and the polyamide acid according to the present embodiment, the solution of the polyimide and polyamide acid according to the present embodiment is added to a poor solvent such as water or alcohol to precipitate, isolate and purify the polyimide and polyamide acid. After that, the purified compound is dissolved again in an organic solvent to the above concentration (equal to or more than 5% by mass and equal to or less than 50% by mass) to adjust the concentration, and the solution adjusted to that concentration is applied to parts of electronic parts and optical parts that require high refraction and high transparency. Therefore, it is possible to form a film having excellent smoothness.

The organic solvent used here is not particularly limited as long as the polyimide and polyamide acid according to the present embodiment are dissolved therein. For example, an organic solvent of the same type as that mentioned in the organic solvent that can be used for the polycondensation reaction can be mentioned. The solvents may be used alone or in combination of two or more thereof.

EXAMPLES

Hereinafter, the present invention will be described in detail with reference to Examples, but the present invention is not limited to these embodiments. Here, "%" of the composition analysis value refers to "area %" of the composition obtained by measuring a raw material or product by gas chromatography (hereinafter referred to as GC. Unless otherwise specified, the detector is FID).

Catalyst Preparation Example 896 g of a special grade reagent $CrCl_3 \cdot 6H_2O$ was dissolved in pure water to make 3.0 L. 400 g of granular alumina was immersed in this solution and left for a whole day and night. Next, the alumina was filtered out, kept at 100° C. in a hot air circulation type dryer, and further dried for a whole day and night. The obtained chromium-supported alumina was filled in a cylindrical SUS316L reaction tube having a diameter of 4.2 cm and a length of 60 cm equipped with an electric furnace, and the temperature was raised to 300° C. while flowing nitrogen gas at a flow rate of about 20 mL/min. In a case where no water outflow was observed, hydrogen fluoride was accompanied by nitrogen gas to gradually increase a concentration thereof. In a case where the hot spot due to the fluorination of the filled chromium-supported alumina reached the outlet end of the reaction tube, the reactor temperature was raised to 350° C. and that state was maintained for 5 hours to prepare a catalyst.

Preparation Example 1

[Scheme 3]

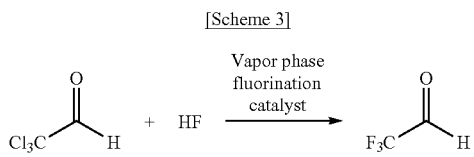

A vapor phase reactor (made of SUS316L, 2.5 cm in diameter and 40 cm in length) consisting of a cylindrical reaction tube equipped with an electric furnace was filled with 125 mL of the catalyst prepared in the above-mentioned catalyst preparation example as a catalyst. The temperature of the reaction tube was raised to 280° C. while flowing air at a flow rate of about 100 mL/min, and hydrogen fluoride was introduced over 1 hour at a rate of about 0.32 g/min. Next, chloral of Formula [1] as a raw material was started to be supplied to the reaction tube at a rate of about 0.38 g/min (contact time: 15 seconds). Since the reaction was stable 1 hour after the start of the reaction, the gas flowing out of the reactor was collected in a SUS304 cylinder with a blow tube cooled with a refrigerant at −15° C. over 18 hours.

In a case where a hydrogen fluoride content, a hydrogen chloride content, and an organic matter content were calculated by titration for 484.8 g of the collected fluoral-containing liquid obtained here, the hydrogen fluoride content was 40% by weight, the hydrogen chloride content was 11% by weight, and the organic matter content was 49% by weight, and the recovery rate of the organic matter was 88% (based on the number of moles of raw material chloral supplied). In addition, in a case where a part of the recovered organic matter was collected in a resin NMR tube and the degree of fluorination was confirmed by $^{19}$F-NMR, low-order fluorinated substances were almost undetected, and it was confirmed that fluorination proceeded quantitatively.

Next, a part of the collected fluoral-containing mixture, 150 g (hydrogen fluoride: 40% by weight, hydrogen chloride: 11% by weight, organic matter: 49% by weight) was placed in a 500 ml SUS reactor equipped with a cooling tube through which a refrigerant at −15° C. was passed, a thermometer and a stirrer, and the reactor was heated to 25° C. While refluxing hydrogen fluoride in the cooling tube under normal pressure, hydrogen chloride slipping through the top tower of the cooling tube was absorbed by water and removed. After refluxing for 5 hours, sampling was carried out from the reactor, and the hydrogen fluoride content, the hydrogen chloride content, and the organic matter content were calculated by titration for the mixture. It was found to be hydrogen fluoride: 44% by weight, hydrogen chloride: 1% by weight, and organic matter: 55% by weight. In addition, a part of the mixture was collected in a resin NMR tube, and from the integral ratio of $^{19}$F-NMR, it was confirmed that fluoral in anhydrous hydrogen fluoride was converted into 1,2,2,2-tetrafluoroethanol which is a fluoral/hydrogen fluoride composition. On the other hand, in a case where the water used for absorbing hydrogen chloride was subjected to titration, the content of hydrogen fluoride due to entrainment was partially observed, but almost no organic matter was contained.

[Physical Properties Data]

1,2,2,2-tetrafluoroethanol $^{19}$F-NMR (400 MHz, CFCl$_3$) δ (ppm): −85.82 (3F, s), −137.95 (1F, d, J=54.9 Hz)
Hydrogen Fluoride:
$^{19}$F-NMR (400 MHz, CFCl$_3$) δ (ppm): −193.37 (1F, s)

Example 1

[Scheme 4]

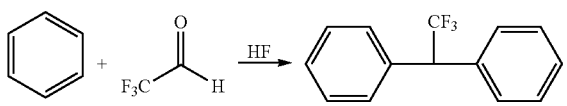

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 4.7 g (60 mmol) of benzene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of benzene was 98%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-diphenylethane in a yield of 97%.

[Physical Properties Data]

1,1,1-trifluoro-2,2-diphenylethane $^1$H-NMR (400 MHz, CDCl$_3$) δ (ppm): 4.68 (1H, q, J=10.0 Hz), 7.30-7.40 (10H, m)

$^{19}$F-NMR (400 MHz, CDCl$_3$, CFCl$_3$) δ (ppm): −65.7 (3F, d, J=8.7 Hz)

Example 2

[Scheme 5]

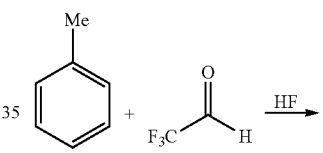

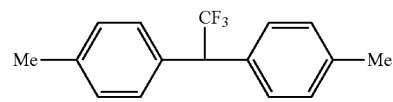

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 5.7 g (60 mmol) of toluene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of toluene was 97%. The organic layer recovered by the extraction operation was washed with 50 g of water and further washed with 50 g of saturated sodium bicarbonate water, and then the organic layer was recovered by the liquid separation operation. The organic layer was concentrated with an evaporator to obtain a target product 1,1,1-trifluoro-2,2-bis(4-methylphenyl)ethane in a yield of 97% and an isomer ratio of 56/32/3/3/2 (2,2-bis(4-methylphenyl) form/2-(4-methylphenyl)-2-(2-methylphenyl) form/unidentified/unidentified/unidentified).

[Physical Properties Data]

1,1,1-trifluoro-2,2-bis(4-methylphenyl)ethane $^1$H-NMR (400 MHz, CDCl$_3$) δ (ppm): 2.31 (6H, s), 4.60 (1H, q, J=10.0 Hz), 7.14 (4H, q, J=8.4 Hz), 7.25 (4H, q, J=7.9 Hz) $^{19}$F-NMR (400 MHz, CDCl$_3$, CFCl$_3$) δ (ppm): −66.5 (3F, d, J=8.7 Hz)

Example 3

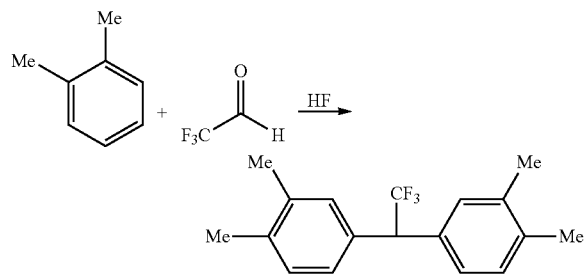

[Scheme 6]

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 6.4 g (60 mmol) of 2-xylene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of 2-xylene was 97%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(3,4-dimethylphenyl)ethane of Formula [6a] in a yield of 98% and an isomer ratio of 76/24 (2,2-bis(3,4-dimethylphenyl) form/2-(3,4-dimethylphenyl)-2-(2,3-dimethylphenyl) form).

[Physical Properties Data]

1,1,1-trifluoro-2,2-bis(3,4-dimethylphenyl)ethane $^1$H-NMR (400 MHz, CDCl$_3$) δ (ppm): 2.31 (12H, s), 4.53 (1H, q, J=10.2 Hz), 7.03-7.15 (6H, m)
$^{19}$F-NMR (400 MHz, CDCl$_3$, CFCl$_3$) δ (ppm): −66.4 (3F, d, J=11.5 Hz)

Example 4

[Scheme 7]

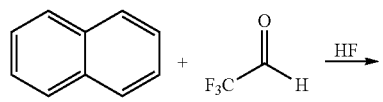

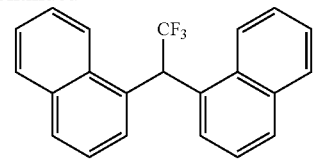

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.7 g (60 mmol) of naphthalene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of naphthalene was 53%. The organic layer recovered by the extraction operation was washed with 50 g of water and further washed with 50 g of saturated sodium bicarbonate water, and then the organic layer was recovered by a liquid separation operation. The organic layer was concentrated with an evaporator, and the recovered product was analyzed by gas chromatography. As a result, naphthalene was 47%, 1,1,1-trifluoro-2,2-bis(naphth-1-yl)ethane was 53%, and the isomer ratio was 57/37/6 (2,2-bis(naphth-1-yl) form/2-(naphth-1-yl)-2-(naphth-2-yl) form/unidentified).

[Physical Properties Data]

1,1,1-trifluoro-2,2-bis(naphth-1-yl)ethane $^1$H-NMR (400 MHz, DMSO-d6) δ (ppm): 6.29 (1H, q, J=10.1 Hz), 7.40-8.00 (14H, m)
$^{19}$F-NMR (400 MHz, DMSO-d6, CFCl$_3$) δ (ppm): −63.0 (3F, d, J=8.6 Hz)

Example 5

[Scheme 8]

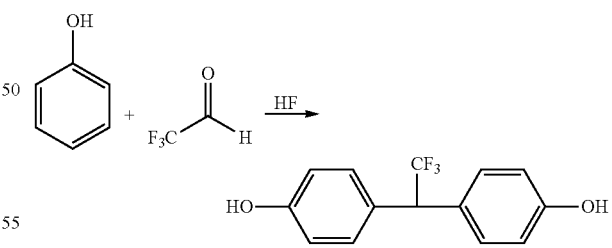

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 5.7 g (60 mmol) of phenol were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of phenol was 96%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(4-hydroxyphenyl) ethane in a yield of 94% and an isomer ratio of 78/22 (2,2-bis) (4-hydroxyphenyl) form/2-(4-hydroxyphenyl)-2-(2-hydroxyphenyl) form).
[Physical Properties Data]

1,1,1-trifluoro-2,2-bis(4-hydroxyphenyl)ethane $^1$H-NMR (400 MHz, CDCl$_3$) δ (ppm): 4.55 (1H, q, J=9.9 Hz), 5.10 (2H, s), 6.80 (4H, d, J=8.6 Hz), 7.22 (4H, d, J=8.83 Hz)
$^{19}$F-NMR (400 MHz, CDCl$_3$, CFCl$_3$) δ (ppm): −66.9 (3F, d, J=8.6 Hz)

Example 6

[Scheme 9]

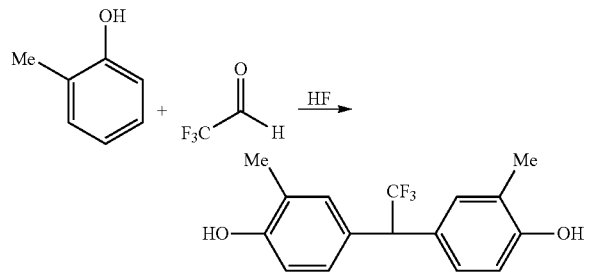

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 6.5 g (60 mmol) of 2-cresol were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of 2-cresol was 93%. The organic layer recovered by the extraction operation was washed with 50 g of water and further washed with 50 g of saturated sodium bicarbonate water, and then the organic layer was recovered by the extraction operation. The organic layer was concentrated with an evaporator to obtain a target product 1,1,1-trifluoro-2,2-bis(3-methyl-4-hydroxyphenyl)ethane in a yield of 93% and an isomer ratio of 96/4 (2,2-bis(3-methyl-4-hydroxyphenyl) form/unidentified).
[Physical Properties Data]

1,1,1-trifluoro-2,2-bis(3-methyl-4-hydroxyphenyl) ethane $^1$H-NMR (400 MHz, CDCl$_3$) δ (ppm): 2.21 (6H, s), 4.47 (1H, q, J=10.1 Hz), 6.76 (2H, d, J=8.3 Hz), 7.05 (2H, d, J=8.3 Hz), 7.08 (2H, s)

$^{19}$F-NMR (400 MHz, CDCl$_3$, CFCl$_3$) δ (ppm): −66.7 (3F, d, J=11.5 Hz)

Example 7

[Scheme 10]

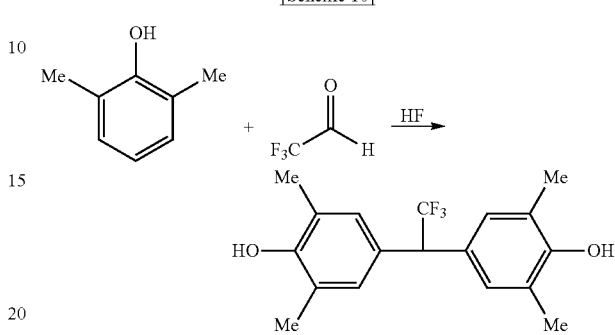

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.4 g (60 mmol) of 2,6-xylenol were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of 2,6-xylenol was 99%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(3,5-dimethyl-4-hydroxyphenyl)ethane in a yield of 96% and an isomer ratio of 96/4 (2,2-bis(3,5-dimethyl-4-hydroxyphenyl) form/unidentified).
[Physical Properties Data]

1,1,1-trifluoro-2,2-bis(3,5-dimethyl-4-hydroxyphenyl)ethane $^1$H-NMR (400 MHz, CD$_3$CN) δ (ppm): 2.18 (12H, s), 4.53 (1H, q, J=10.6 Hz), 6.13 (2H, s), 7.00 (4H, s)
$^{19}$F-NMR (400 MHz, CD$_3$CN, CFCl$_3$) δ (ppm): −66.5 (3F, d, J=11.5 Hz)

Example 8

[Scheme 11]

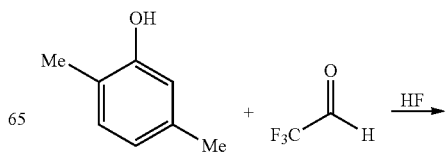

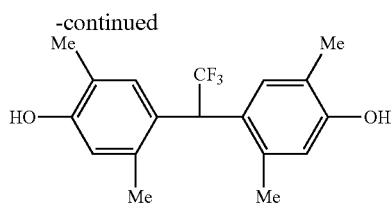

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.4 g (60 mmol) of 2,5-xylenol were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of 2,5-xylenol was 93%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(2,5-dimethyl-4-hydroxyphenyl)ethane of Formula [7a] in a yield of 92% and an isomer ratio of 98/2 (2,2-bis(2,5-dimethyl-4-hydroxyphenyl) form/unidentified).
[Physical Properties Data]

1,1,1-trifluoro-2,2-bis(2,5-dimethyl-4-hydroxyphenyl)

$^1$H-NMR (400 MHz, CD$_3$CN) δ (ppm): 2.08 (6H, s), 2.16 (6H, s), 4.93 (1H, q, J=10.0 Hz), 6.58 (2H, s), 6.71 (2H, s), 7.05 (2H, s)
$^{19}$F-NMR (400 MHz, CD$_3$CN, CFCl$_3$) δ (ppm): −65.5 (3F, d, J=8.7 Hz)

Example 9

[Scheme 12]

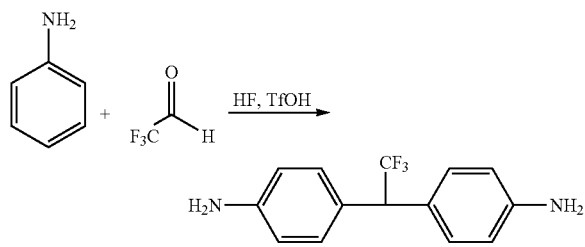

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, 5.6 g (60 mmol) of aniline, and 2.3 g (15 mmol) of trifluoromethanesulfonic acid were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 100 g of ice, 70 g of a 48% potassium hydroxide aqueous solution was added thereto for neutralization, and an organic matter was extracted with 100 g of ethyl acetate. In a case where the extracted organic layer was analyzed by gas chromatography, the conversion rate of aniline was 96%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(4-aminophenyl) ethane in a yield of 93% and an isomer ratio of 92/8 (2,2-bis(4-aminophenyl) form/unidentified).
[Physical Properties Data]

1,1,1-trifluoro-2,2-bis(4-aminophenyl)ethane $^1$H-NMR (400 MHz, CDCl$_3$) δ (ppm): 3.42 (4H, s), 4.45 (1H, q, J=10.1 Hz), 6.62 (4H, d, J=8.3 Hz), 7.12 (4H, d, J=8.3 Hz)
$^{19}$F-NMR (400 MHz, CDCl$_3$, CFCl$_3$) δ (ppm): −66.9 (3F, d, J=11.5 Hz)

Example 10

[Scheme 13]

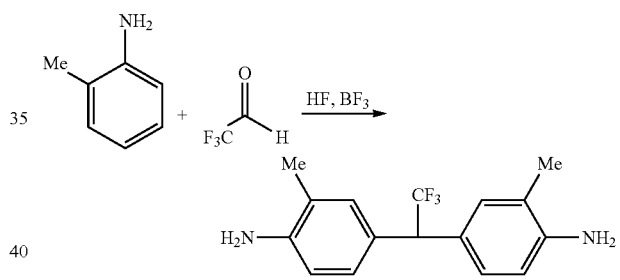

15.9 g (fluoral: 90 mmol, hydrogen fluoride: 0.36 mol) of the fluoral-containing mixture (hydrogen fluoride: 44% by weight, hydrogen chloride: 1% by weight, organic matter: 55% by weight) obtained in Preparation Example 1, 28.8 g (1.44 mol) of hydrogen fluoride, 19.5 g (0.18 mol) of 2-toluidine, and 3.0 g (45 mmol) of boron trifluoride were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 300 g of ice, 210 g of a 48% potassium hydroxide aqueous solution was added thereto for neutralization, and an organic matter was extracted with 300 g of ethyl acetate. In a case where the extracted organic layer was analyzed by gas chromatography, the conversion rate of 2-toluidine was 98%. The organic layer recovered by the extraction operation was washed with 150 g of water and further washed with 150 g of saturated sodium bicarbonate water, and then the organic layer was recovered by the liquid separation operation. The organic layer was concentrated with an evaporator to obtain a target product 1,1,1-trifluoro-2,2-bis(3-methyl-4-aminophenyl)ethane of Formula [3] in a yield of 96% and an isomer ratio of 96/4. 25 g of the obtained crude crystals and 75 g of toluene were added to a 200 mL glass reactor equipped with a thermometer protection tube and a stirring motor, the temperature was raised to 90° C. to completely dissolve the crystals, and 50 g of heptane was added dropwise over 1 hour to precipitate crystals. After the temperature was lowered to 30° C., the crystals recovered by filtration were dried with an evaporator to obtain a target product 1,1,1-trifluoro-2,2-bis(3-methyl-4-aminophenyl)ethane of Formula [3a] in a yield of 87%, a purity of 99.8%, and an isomer ratio of equal to or more than 99% (2,2-bis(3-methyl-4-aminophenyl) form).

[Physical Properties Data]

1,1,1-trifluoro-2,2-bis(3-methyl-4-aminophenyl) ethane $^1$H-NMR (400 MHz, CDCl$_3$) δ (ppm): 2.13 (6H, s), 3.14 (4H, s), 4.41 (1H, q, J=10.4 Hz), 6.62 (2H, d, J=10.4 Hz), 7.01 (2H, s), 7.02 (2H, d, J=8.3 Hz)

$^{19}$F-NMR (400 MHz, CDCl$_3$, CFCl$_3$) δ (ppm): −66.7 (3F, d, J=11.5 Hz)

Example 11

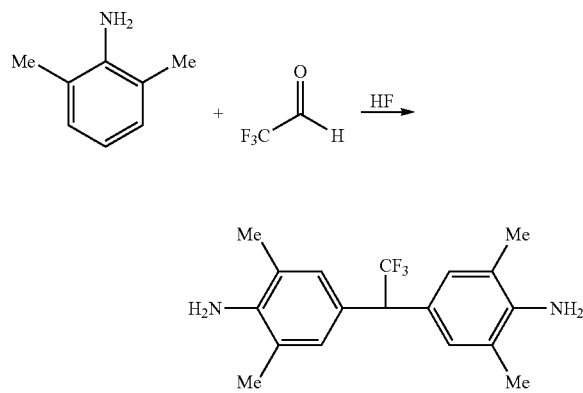

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.3 g (60 mmol) of 2,6-xylidine were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 100 g of ice, 70 g of a 48% potassium hydroxide aqueous solution was added thereto for neutralization, and an organic matter was extracted with 100 g of ethyl acetate. In a case where the extracted organic layer was analyzed by gas chromatography, the conversion rate of 2,6-xylidine was 99%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(3,5-dimethyl-4-aminophenyl)ethane of Formula [4a] in a yield of 95% and an isomer ratio of 97/3 (2,2-bis(3,5-dimethyl-4-aminophenyl) form/unidentified).

[Physical Properties Data]

1,1,1-trifluoro-2,2-bis(3,5-dimethyl-4-aminophenyl) ethane $^1$H-NMR (400 MHz, CDCl$_3$) δ (ppm) 2.15 (12H, s), 3.55 (4H, s), 4.36 (1H, q, J=10.4 Hz), 6.62 (2H, d, J=10.4 Hz), 6.93 (4H, s)

$^{19}$F-NMR (400 MHz, CDCl$_3$, CFCl$_3$) δ (ppm): −66.6 (3F, d, J=8.6 Hz)

Example 12

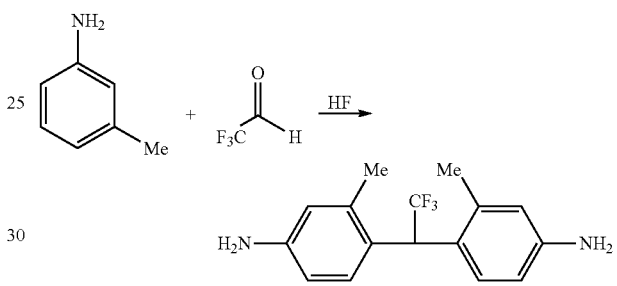

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 6.5 g (60 mmol) of 3-toluidine were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 100 g of ice, 70 g of a 48% potassium hydroxide aqueous solution was added thereto for neutralization, and an organic matter was extracted with 100 g of ethyl acetate. In a case where the extracted organic layer was analyzed by gas chromatography, the conversion rate of 3-toluidine was 83%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(2-methyl-4-aminophenyl)ethane of Formula [3b] in a yield of 71% and an isomer ratio of 97/2/1 (2,2-bis(2-methyl-4-aminophenyl) form/unidentified/unidentified).

[Physical Properties Data]

1,1,1-trifluoro-2,2-bis(2-methyl-4-aminophenyl) ethane $^1$H-NMR (400 MHz, CDCl$_3$) δ (ppm): 2.21 (6H, s), 3.58 (4H, bs), 4.83 (1H, q, J=9.6 Hz), 6.48 (2H, s), 6.50 (2H, d, J=9.4 Hz), 7.17 (2H, d, J=8.7 Hz)

$^{19}$F-NMR (400 MHz, CDCl$_3$, CFCl$_3$) δ (ppm): −65.6 (3F, d, J=11.6 Hz)

Example 13

[Scheme 16]

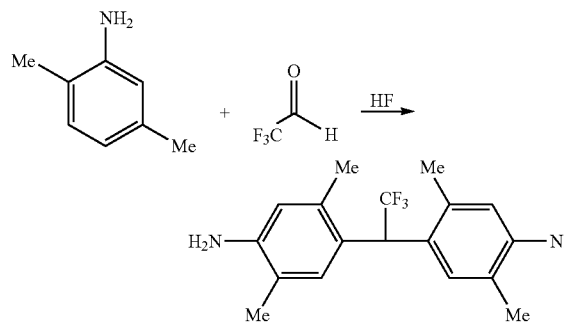

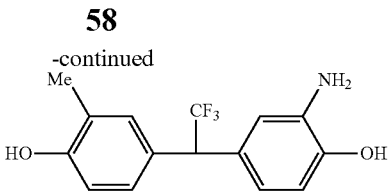

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.3 g (60 mmol) of 2,5-xylidine were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 100 g of ice, 70 g of a 48% potassium hydroxide aqueous solution was added thereto for neutralization, and an organic matter was extracted with 100 g of ethyl acetate. In a case where the extracted organic layer was analyzed by gas chromatography, the conversion rate of 2,5-xylidine was 98%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(2,5-dimethyl-4-aminophenyl)ethane of Formula [4c] in a yield of 94% and an isomer ratio of 99/1 (2,2-bis(2,5-dimethyl-4-aminophenyl) form/unidentified).

[Physical Properties Data]

1,1,1-trifluoro-2,2-bis(2,5-dimethyl-4-aminophenyl)ethane $^1$H-NMR (400 MHz, CDCl$_3$) δ (ppm): 2.12 (6H, s), 2.19 (6H, s), 3.53 (4H, bs), 4.80 (1H, q, J=9.6 Hz), 6.45 (2H, s), 7.04 (2H, s)

$^{19}$F-NMR (400 MHz, CDCl$_3$, CFCl$_3$) δ (ppm): −65.5 (3F, d, J=8.7 Hz)

Example 14

[Scheme 17]

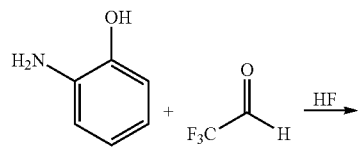

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 6.6 g (60 mmol) of 2-aminophenol were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.3 MPa for 5 hours. The reaction solution was poured into 100 g of ice, 70 g of a 48% potassium hydroxide aqueous solution was added thereto for neutralization, and the precipitated solid was recovered by suction filtration and analyzed by liquid chromatography. As a result, the conversion rate of 2-aminophenol was 97%. The obtained solid was dried with an evaporator to obtain a target product 1,1,1-trifluoro-2,2-bis(3-amino-4-hydroxyphenyl)ethane of Formula [5a] in a yield of 95% and an isomer ratio of 88/12 (2,2-bis(3-amino-4-hydroxyphenyl) form/2-(3-amino-4-hydroxyphenyl)-2-(3-hydroxy-4-aminophenyl) form).

[Physical Properties Data]

1,1,1-trifluoro-2,2-bis(3-amino-4-hydroxyphenyl)ethane $^1$H-NMR (400 MHz, CD$_3$OD) δ (ppm): 4.41 (1H, q, J=10.42 Hz), 4.88 (6H, s), 6.60-6.80 (6H, m)

$^{19}$F-NMR (400 MHz, CD$_3$OD, CFCl$_3$) δ (ppm): −66.8 (3F, d, J=11.6 Hz)

Example 15

[Scheme 18]

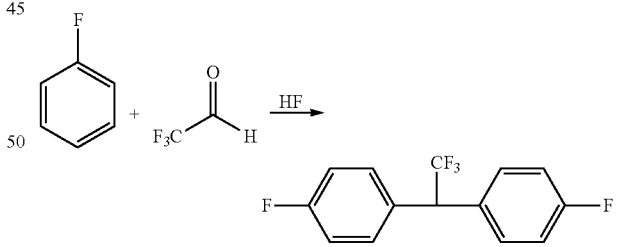

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 5.8 g (60 mmol) of fluorobenzene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of fluorobenzene was 99%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(4-fluorophenyl)ethane in a yield of 93% and an isomer ratio of 84/16 (2,2-bis(4-fluorophenyl) form/2-(4-fluorophenyl)-2-(2-fluorophenyl) form).
[Physical Properties Data]

1,1,1-trifluoro-2,2-bis(4-fluorophenyl)ethane $^1$H-NMR (400 MHz, CDCl$_3$) δ (ppm): 4.66 (1H, q, J=9.7 Hz), 7.02-7.06 (4H, m), 7.30 (2H, d, J=8.8 Hz), 7.32 (2H, d, J=8.8 Hz)
$^{19}$F-NMR (400 MHz, CDCl$_3$, CFCl$_3$) δ (ppm): −66.3 (3F, d, J=8.7 Hz), −113.8 (2F, s)

Example 16

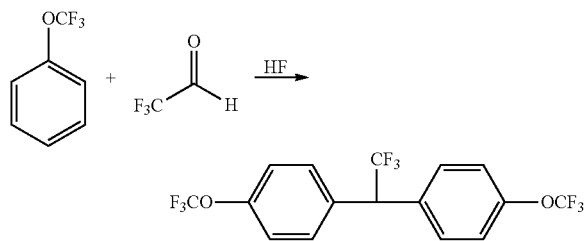

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 9.8 g (60 mmol) of trifluoromethoxybenzene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of trifluoromethoxybenzene was 96%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(4-trifluoromethoxyphenyl)ethane in a yield of 94% and an isomer ratio of 91/9 (2,2-bis(4-trifluoromethoxyphenyl) form/unidentified).
[Physical Properties Data]

1,1,1-trifluoro-2,2-bis(4-trifluoromethoxyphenyl)ethane $^1$H-NMR (400 MHz, CDCl$_3$) δ (ppm): 4.72 (1H, q, J=9.7 Hz), 7.21 (4H, d, J=8.6 Hz), 7.38 (4H, d, J=8.6 Hz)
$^{19}$F-NMR (400 MHz, CDCl$_3$, CFCl$_3$) δ (ppm): −57.3 (6F, s), −66.1 (3F, d, J=8.7 Hz)

Example 17

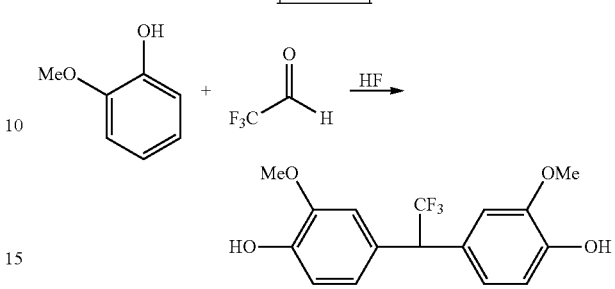

5.3 g (fluoral: 30 mmol, hydrogen fluoride: 0.12 mol) of the fluoral-containing mixture (hydrogen fluoride: 44% by weight, hydrogen chloride: 1% by weight, organic matter: 55% by weight) obtained in Preparation Example 1, 9.6 g (0.48 mol) of hydrogen fluoride, and 7.5 g (60 mmol) of guaiacol were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, the conversion rate of guaiacol was 96%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(3-methoxy-4-hydroxyphenyl)ethane of Formula [8] in a yield of 85% and an isomer ratio of 49/30/13 (2,2-bis(3-methoxy-4-hydroxyphenyl) form/2-(3-methoxy-4-hydroxyphenyl)-2-(3-hyodroxy-4-methoxyphen yl) form/2,2-bis(3-hydroxy-4-methoxyphenyl) form).
[Physical Properties Data]

1,1,1-trifluoro-2,2-bis(3-methoxy-4-hydroxyphenyl)ethane $^1$H-NMR (400 MHz, CDCl$_3$) δ (ppm): 3.81-3.84 (6H, s), 4.47-4.57 (1H, m), 6.78-6.96 (6H, m)
$^{19}$F-NMR (400 MHz, CDCl$_3$, CFCl$_3$) δ (ppm): −66.1 (3F, d, J=8.7)

Example 18

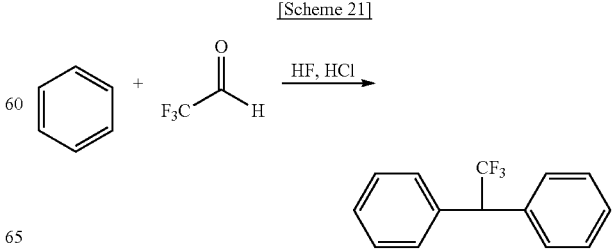

6.0 g (fluoral: 30 mmol, hydrogen fluoride: 0.12 mol) of the fluoral-containing mixture (hydrogen fluoride: 40% by weight, hydrogen chloride: 11% by weight, organic matter: 49% by weight) collected in Preparation Example 1, 9.6 g (0.48 mol) of hydrogen fluoride, and 4.7 g (60 mmol) of benzene were weighed in a 100 mL stainless steel autoclave reactor equipped with a pressure gauge, a thermometer protection tube, an insertion tube, and a stirring motor, and reacted at 25° C. and an absolute pressure of 0.1 MPa for 24 hours. The reaction solution was poured into 50 g of ice, and the organic matter was extracted with 50 g of ethyl acetate. In a case where the extracted organic layer was analyzed by gas chromatography, the conversion rate of benzene was 99%, and 1,1,1-trifluoro-2,2-diphenylethane was 79%.

Example 19

[Scheme 25]

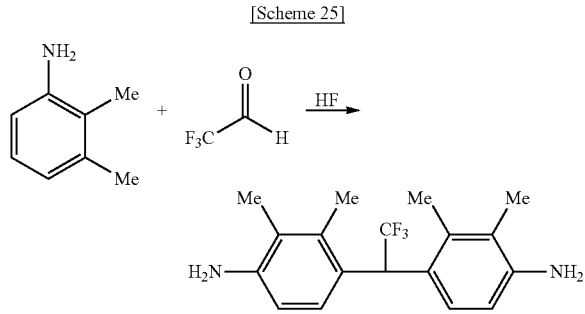

15.5 g (fluoral: 82 mmol, hydrogen fluoride: 0.37 mol) of the fluoral-containing mixture (hydrogen fluoride: 48% by weight, hydrogen chloride: less than 0.1% by weight, organic matter: 52% by weight) prepared in the same manner as in Preparation Example 1, 12.4 g (0.62 mol) of hydrogen fluoride, and 20 g (165 mmol) of 2,3-xylidine were weighed in a 100 mL stainless steel autoclave reactor equipped with a pressure gauge, a thermometer protection tube, an insertion tube, and a stirring motor, heated in an oil bath at 150° C., and reacted at an absolute pressure of 0.55 MPa for 18 hours. The reaction solution was poured into 100 g of ice, 116 g of a 48% potassium hydroxide aqueous solution was added thereto for neutralization, and an organic matter was extracted with 100 g of ethyl acetate. In a case where the extracted organic layer was analyzed by gas chromatography, the conversion rate of 2,3-xylidine was 90%. The organic layer recovered by the extraction operation was washed with 50 g of water and further washed with 50 g of saturated sodium bicarbonate water, and then the organic layer was recovered by a liquid separation operation. The organic layer was concentrated with an evaporator to obtain a target product 1,1,1-trifluoro-2,2-bis(2,3-dimethyl-4-aminophenyl)ethane (Formula [4b]) of Formula [4b] in a yield of 77% and an isomer ratio of 99/1 (2,2-bis(2,3-dimethyl-4-aminophenyl) form/unidentified).
[Physical Properties Data]

1,1,1-trifluoro-2,2-bis(2,3-dimethyl-4-aminophenyl)ethane $^1$H-NMR (400 MHz, CDCl$_3$) δ (ppm): 2.10 (6H, s), 2.18 (6H, s), 4.19 (4H, bs), 5.01 (1H, q, J=9.6 Hz), 6.59 (2H, d, J=8.4 Hz), 7.07 (2H, d, J=8.4 Hz)

$^{19}$F-NMR (400 MHz, CDCl$_3$, CFCl$_3$) δ (ppm): −64.6 (3F, d, J=9.2 Hz)

Example 20

[Scheme 26]

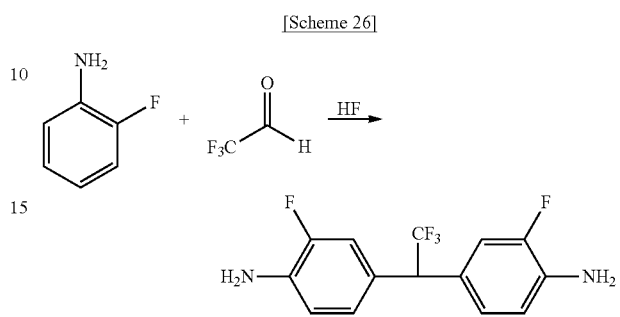

5.6 g (fluoral: 30 mmol, hydrogen fluoride: 134 mmol) of the fluoral-containing mixture (hydrogen fluoride: 48% by weight, hydrogen chloride: less than 0.1% by weight, organic matter: 52% by weight) prepared in the same manner as in Preparation Example 1, 4.5 g (226 mmol) of hydrogen fluoride, and 6.7 g (60 mmol) of 2-fluoroaniline were weighed in a 100 mL stainless steel autoclave reactor equipped with a pressure gauge, a thermometer protection tube, an insertion tube, and a stirring motor, heated in an oil bath at 150° C., and reacted at an absolute pressure of 0.8 MPa for 20 hours. The reaction solution was poured into a mixture of 50 g of ice water and 50 mL of ethyl acetate. After neutralization of the reaction solution by adding 42 g of a 48% potassium hydroxide aqueous solution, the organic layer was washed with 50 g of water, and the organic layer was recovered by a liquid separation operation. In a case where the extracted organic layer was analyzed by gas chromatography, the conversion rate of 2-fluoroaniline was 99%. The organic layer was concentrated with an evaporator to obtain a target product 1,1,1-trifluoro-2,2-bis(3-fluoro-4-aminophenyl)ethane of Formula [11a] in a yield of 93% and an isomer ratio of 50/1 (2,2-bis(3-fluoro-4-aminophenyl) form/unidentified).
[Physical Properties Data]

1,1,1-trifluoro-2,2-bis(3-fluoro-4-aminophenyl)ethane $^1$H-NMR (400 MHz, CDCl$_3$) δ (ppm): 3.71 (4H, br-s), 4.43 (1H, q, J=9.6 Hz), 6.71 (2H, dd, J=12.0, 8.0 Hz), 6.90 (2H, d, J=8.0 Hz), 6.97 (2H, d, J=12.0 Hz)

$^{19}$F-NMR (400 MHz, CDCl$_3$, CFCl$_3$) δ (ppm): −134.3 (2F, br-s), −66.4 (3F, d, J=8.7 Hz)

Example 21

[Scheme 27]

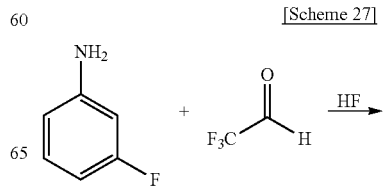

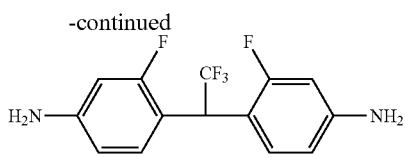

5.6 g (fluoral: 30 mmol, hydrogen fluoride: 134 mmol) of the fluoral-containing mixture (hydrogen fluoride: 48% by weight, hydrogen chloride: less than 0.1% by weight, organic matter: 52% by weight) prepared in the same manner as in Preparation Example 1, 9.3 g (465 mmol) of hydrogen fluoride, and 6.7 g (60 mmol) of 3-fluoroaniline were weighed in a 100 mL stainless steel autoclave reactor equipped with a pressure gauge, a thermometer protection tube, an insertion tube, and a stirring motor, heated in an oil bath at 150° C., and reacted at an absolute pressure of 1.0 MPa for 16 hours. The reaction solution was poured into a mixture of 200 g of ice water and 100 mL of ethyl acetate. After neutralization of the reaction solution by adding 70 g of a 48% potassium hydroxide aqueous solution, the organic layer was washed with 50 g of water, and the organic layer was recovered by a liquid separation operation. In a case where the extracted organic layer was analyzed by gas chromatography, the conversion rate of 2-fluoroaniline was 94%. The organic layer was concentrated with an evaporator to obtain a target product 1,1,1-trifluoro-2,2-bis(2-fluoro-4-aminophenyl)ethane of Formula [11b] in a yield of 80% and an isomer ratio of 69/1 (2,2-bis(2-fluoro-4-aminophenyl) form/unidentified).
[Physical Properties Data]

1,1,1-trifluoro-2,2-bis(2-fluoro-4-aminophenyl)ethane $^1$H-NMR (400 MHz, CDCl$_3$) δ (ppm): 3.70 (4H, br-s), 5.20 (1H, q, J=9.6 Hz), 6.34 (2H, d, J=11.6 Hz), 6.39 (2H, d, J=8.4 Hz), 7.20 (2H, dd, J=11.6, 8.4 Hz)
$^{19}$F-NMR (400 MHz, CDCl$_3$, CFCl$_3$) δ (ppm): −1116.5 (2F, br-s), −66.5 (3F, d, J=8.7 Hz)

Example 22

[Scheme 28]

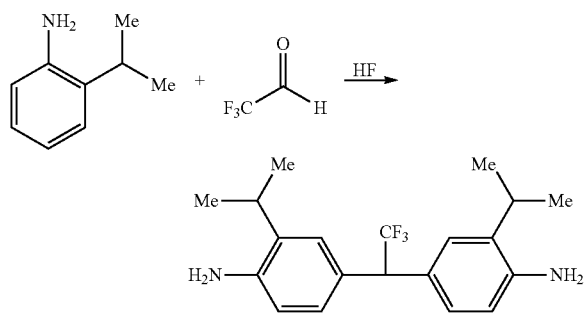

9.4 g (fluoral: 50 mmol, hydrogen fluoride: 226 mmol) of the fluoral-containing mixture (hydrogen fluoride: 48% by weight, hydrogen chloride: less than 0.1% by weight, organic matter: 52% by weight) prepared in the same manner as in Preparation Example 1, 15.5 g (774 mmol) of hydrogen fluoride, and 13.5 g (100 mmol) of 2-isopropylaniline were weighed in a 100 mL stainless steel autoclave reactor equipped with a pressure gauge, a thermometer protection tube, an insertion tube, and a stirring motor, heated in an oil bath at 150° C., and reacted at an absolute pressure of 0.9 MPa for 24 hours. The reaction solution was poured into a mixture of 72 g of ice water and 50 mL of ethyl acetate. After neutralization of the reaction solution by adding 170 g of a 48% potassium hydroxide aqueous solution, the organic layer was washed with 50 g of water, and the organic layer was recovered by the liquid separation operation. In a case where the extracted organic layer was analyzed by gas chromatography, the conversion rate of 2-isopropylaniline was 60%. The organic layer was concentrated with an evaporator to obtain a target product 1,1,1-trifluoro-2,2-bis(3-isopropyl-4-aminophenyl)ethane of Formula [16] in a yield of 57% and an isomer ratio of 24/1 (2,2-bis(3-isopropyl-4-aminophenyl) form/unidentified).
[Physical Properties Data]

1,1,1-trifluoro-2,2-bis(3-isopropyl-4-aminophenyl)ethane $^1$H-NMR (400 MHz, CDCl$_3$) δ (ppm): 1.23 (12H, d, J=6.8 Hz) 2.87 (2H, qq, J=6.8, 6.8 Hz), 3.64 (4H, br-s), 4.44 (1H, q, J=10.0 Hz), 6.61 (2H, d, J=8.4 Hz), 7.02 (2H, d, J=8.4 Hz), 7.14 (2H, s)
$^{19}$F-NMR (400 MHz, CDCl$_3$, CFCl$_3$) δ (ppm): −66.3 (3F, d, J=8.7 Hz)

Example 29

[Scheme 29]

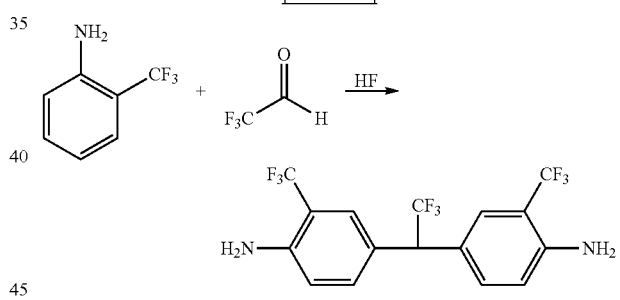

5.6 g (fluoral: 30 mmol, hydrogen fluoride: 135 mmol) of the fluoral-containing mixture (hydrogen fluoride: 48% by weight, hydrogen chloride: less than 0.1% by weight, organic matter: 52% by weight) prepared in the same manner as in Preparation Example 1, 9.3 g (465 mmol) of hydrogen fluoride, and 9.7 g (60 mmol) of 2-aminobenzotrifluoride were weighed in a 50 mL stainless steel autoclave reactor equipped with a pressure gauge, a thermometer protection tube, an insertion tube, and a stirring motor, heated in an oil bath at 150° C., and reacted at an absolute pressure of 1.1 MPa for 18 hours. The reaction solution was poured into a mixture of 50 g of ice water and 50 mL of ethyl acetate. After neutralization of the reaction solution by adding 70 g of a 48% potassium hydroxide aqueous solution, the organic layer was washed with 50 g of water, and the organic layer was recovered by a liquid separation operation. In a case where the extracted organic layer was analyzed by gas chromatography, the conversion rate of 2-aminobenzotrifluoride was 85%. The organic layer was concentrated with an evaporator to obtain a target product 1,1,1-trifluoro-2,2-bis(3-trifluoromethyl-4-aminophenyl)ethane of Formula

[12a] in a yield of 62% and an isomer ratio of 8/1 (2,2-bis(3-trifluoromethyl-4-aminophenyl) form/unidentified).

[Physical Properties Data]

1,1,1-trifluoro-2,2-bis(3-trifluoromethyl-4-aminophenyl)ethane $^1$H-NMR (400 MHz, CDCl$_3$) δ (ppm) 4.20 (4H, br-s) 4.47 (1H, q, J=9.5 Hz), 6.71 (2H, d, J=8.9 Hz), 7.25 (2H, d, J=8.9 Hz), 7.35 (2H, s)

$^{19}$F-NMR (400 MHz, CDCl$_3$, CFCl$_3$) δ (ppm): −66.6 (3F, d, J=8.7 Hz), −62.8 (6F, s)

Example 24

[Scheme 30]

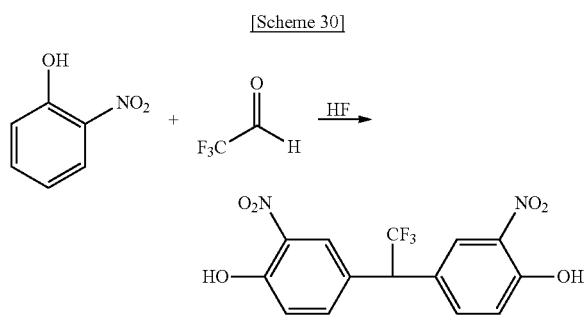

21.1 g (fluoral: 111 mmol, hydrogen fluoride: 506 mmol) of the fluoral-containing mixture (hydrogen fluoride: 48% by weight, hydrogen chloride: less than 0.1% by weight, organic matter: 52% by weight) prepared in the same manner as in Preparation Example 1, 33.4 g (1.67 mol) of hydrogen fluoride, and 30 g (215 mmol) of 2-nitrophenol were weighed in a 100 mL stainless steel autoclave reactor equipped with a pressure gauge, a thermometer protection tube, an insertion tube, and a stirring motor, heated in an oil bath at 140° C., and reacted at an absolute pressure of 1.6 MPa for 24 hours. The reaction solution was poured into a mixture of 120 g of ice water and 120 mL of ethyl acetate. The separated organic layer was washed with 240 g of saturated sodium bicarbonate water and further washed with 120 g of water, and then the organic layer was recovered by the liquid separation operation. In a case where the extracted organic layer was analyzed by gas chromatography, the conversion rate of 2-nitrophenol was 99%. The organic layer was concentrated with an evaporator to obtain a target product 1,1,1-trifluoro-2,2-bis(3-nitro-4-hydroxyphenyl)ethane of Formula [15] in a yield of 95% and an isomer ratio of 3/1 (2,2-bis(3-nitro-4-hydroxyphenyl) form/2-(3-nitro-4-hydroxyphenyl)-2-(2-hydroxy-3-nitrophenyl) form).

[Physical Properties Data]

1,1,1-trifluoro-2,2-bis(3-nitro-4-hydroxyphenyl)ethane $^1$H-NMR (400 MHz, CDCl$_3$) δ (ppm): 4.69 (1H, q, J=9.4 Hz), 7.20 (2H, d, J=8.9 Hz), 7.55 (2H, dd, J=8.7, 2.3 Hz), 8.09 (2H, d, J=2.3 Hz), 10.57 (2H, s)

$^{19}$F-NMR (400 MHz, CDCl$_3$, CFCl$_3$) δ (ppm): −66.9 (3F, d, J=8.7 Hz)

Example 25

[Scheme 31]

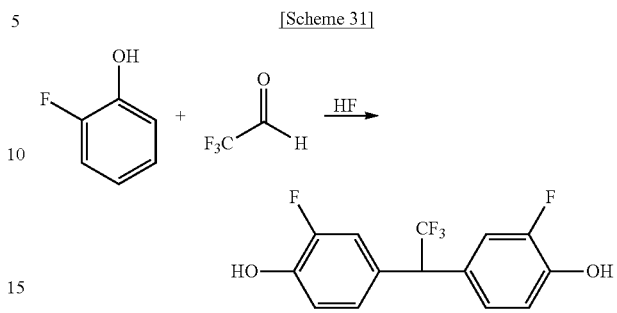

32.5 g (fluoral: 182 mmol, hydrogen fluoride: 715 mmol) of the fluoral-containing mixture (hydrogen fluoride: 44% by weight, hydrogen chloride: 1% by weight, organic matter: 55% by weight) obtained in Preparation Example 1, 29.6 g (1.48 mol) of hydrogen fluoride, and 39.9 g (0.365 mmol) of 2-fluorophenol were weighed in a 100 mL stainless steel autoclave reactor equipped with a pressure gauge, a thermometer protection tube, an insertion tube, and a stirring motor, and reacted at 60° C. and an absolute pressure of 1.0 MPa for 4 hours. The reaction solution was poured into 400 g of ice, and the organic matter was extracted with 400 g of ethyl acetate. In a case where the extracted organic layer was analyzed by gas chromatography, the conversion rate of 2-fluorophenol was 99%. The organic layer recovered by the extraction operation was washed with 100 g of water and further washed with 100 g of saturated sodium bicarbonate water, and then the organic layer was recovered by the liquid separation operation. The organic layer was concentrated with an evaporator to obtain a target product 1,1,1-trifluoro-2,2-bis(3-fluoro-4-hydroxyphenyl)ethane of Formula [14a] in a yield of 85% and an isomer ratio of 94/6 (2,2-bis(3-fluoro-4-hydroxyphenyl) form/unidentified).

[Physical Properties Data]

1,1,1-trifluoro-2,2-bis(3-fluoro-4-hydroxyphenyl)ethane $^1$H-NMR (400 MHz, CDCl$_3$) δ (ppm): 4.74 (1H, q), 6.93 (2H, t, J=8.7 Hz), 7.03 (2H, d, J=8.5 Hz), 7.12 (2H, d, J=12.1 Hz), 7.22 (2H, br-s)

$^{19}$F-NMR (400 MHz, CDCl$_3$, CFCl$_3$) δ (ppm): −136.3 (2F, t, J=11.5 Hz), −66.0 (3F, d, J=8.7 Hz)

Example 26

[Scheme 32]

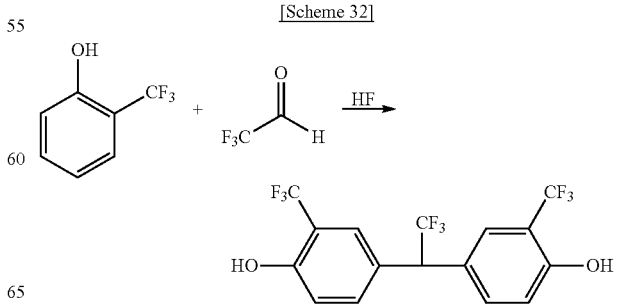

9.41 g (fluoral: 50 mmol, hydrogen fluoride: 226 mmol) of the fluoral-containing mixture (hydrogen fluoride: 48% by weight, hydrogen chloride: less than 0.1% by weight, organic matter: 52% by weight) prepared in the same manner as in Preparation Example 1, 15.5 g (774 mmol) of hydrogen fluoride, and 16.2 g (100 mmol) of 2-trifluoromethylphenol were weighed in a 100 mL stainless steel autoclave reactor equipped with a pressure gauge, a thermometer protection tube, an insertion tube, and a stirring motor, and reacted at room temperature and an absolute pressure of 0.15 MPa for 24 hours. The reaction solution was poured into a mixture of 100 g of ice water and 140 mL of ethyl acetate. The separated organic layer was neutralized with 240 g of saturated sodium bicarbonate water 100 g and further washed with 40 g of water, and then the organic layer was recovered by the liquid separation operation. In a case where the extracted organic layer was analyzed by gas chromatography, the conversion rate of 2-trifluoromethylphenol was 96%. The organic layer was concentrated with an evaporator to obtain a target product 1,1,1-trifluoro-2,2-bis(3-trifluoromethyl-4-hydroxyphenyl)ethane of Formula [13a] in a yield of 67% and an isomer ratio of 25/1 (2,2-bis(3-trifluoromethyl-4-hydroxyphenyl) form/unidentified).

[Physical Properties Data]

1,1,1-trifluoro-2,2-bis(3-trifluoromethyl-4-hydroxyphenyl)ethane $^{19}$F-NMR (400 MHz, CDCl$_3$, CFCl$_3$) δ (ppm): −67.1 (3F, d, J=8.7 Hz), −62.7 (6F, s)

Comparative Example 1

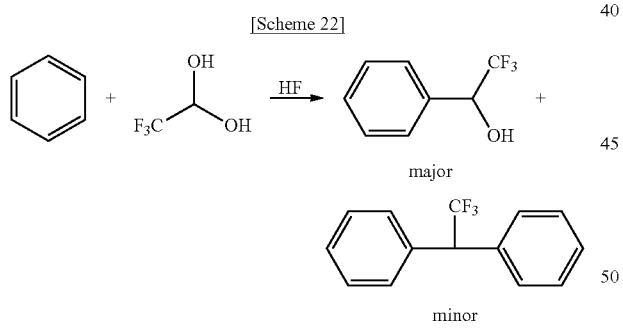

5.4 g (30 mmol) of a 35% hydrous fluoral hydrate, 12 g (0.60 mol) of hydrogen fluoride, and 4.7 g (60 mmol) of benzene were weighed in a 100 mL stainless steel autoclave reactor equipped with a pressure gauge, a thermometer protection tube, an insertion tube, and a stirring motor, and reacted at 25° C. and an absolute pressure of 0.2 MPa for 24 hours. The reaction solution was poured into 50 g of ice, and the organic matter was extracted with 50 g of ethyl acetate. In a case where the extracted organic layer was analyzed by gas chromatography, benzene was 19%, 1,1,1-trifluoro-2-phenyl-2-hydroxyethane was 73%, a target product 1,1,1-trifluoro-2,2-diphenylethane was 7%, and the others were 1%.

Comparative Example 2

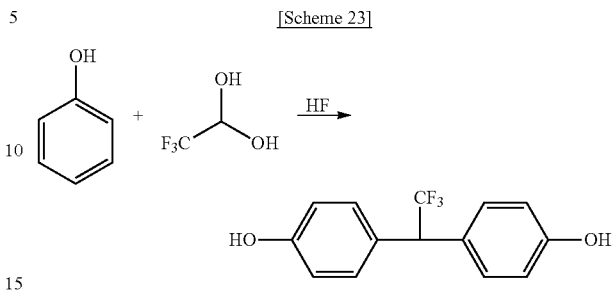

5.4 g (30 mmol) of a 35% hydrous fluoral hydrate, 3 g (0.15 mol) of hydrogen fluoride, and 5.7 g (60 mmol) of phenol were weighed in a 100 mL stainless steel autoclave reactor equipped with a pressure gauge, a thermometer protection tube, an insertion tube, and a stirring motor, and reacted at room temperature for 15 hours. The reaction solution was poured into 50 g of ice, and the organic matter was extracted with 50 g of ethyl acetate. In a case where the extracted organic layer was analyzed by gas chromatography, phenol was 60%, 1,1,1-trifluoro-2-(4-hydroxyphenyl)-2-hydroxyethane was 11%, a target product 1,1,1-trifluoro-2,2-bis(4-hydroxyphenyl)ethane was 24%, and others were 5%.

Example 27

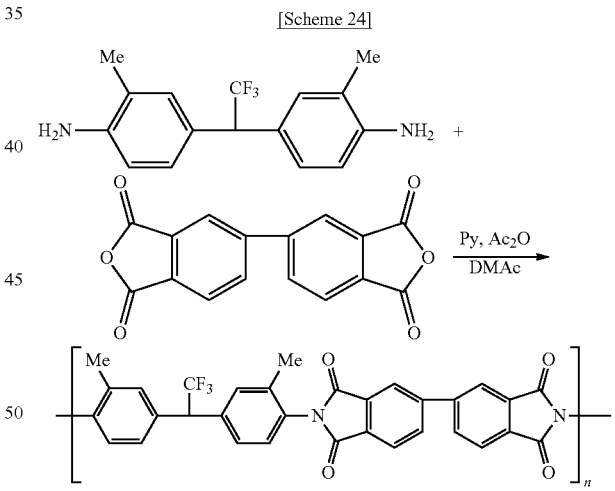

15 g (51 mmol) of 1,1,1-trifluoro-2,2-bis(3-methyl-4-aminophenyl)ethane of Formula obtained in Example 10, 15 g (51 mmol) of 3,3',4,4'-biphenyltetracarboxylic anhydride, and 120 g of dimethylacetamide (ultra-dehydrated product) were weighed and dissolved in a 500 mL glass four-neck separable flask reactor equipped with a mechanical stirrer and a thermometer under a nitrogen stream. The solution was reacted in a constant-temperature bath at 20° C. for 24 hours to synthesize a polyamide acid (polyamic acid) and then 8.5 g (0.11 mmol) of pyridine and 10.9 g (0.11 mmol) of acetic anhydride were added thereto, followed by stirring for 2 hours to carry out chemical imidization. The solution subjected to chemical imidization was a uniform, highly viscous liquid and was not gelled, indicating that the synthesized polyimide has high solvent solubility. The molecular weight of the obtained polyimide was measured by gel permeation chromatography (GPC) and found to be 750,000. The polyimide solution was applied to a glass plate by spin coating and calcined in an inert gas oven under a nitrogen stream to prepare a self-supported film. The 5% weight loss temperature of the prepared self-supported film under a nitrogen stream was measured by a thermogravimetric differential thermal analyzer (TGDTA) and found to be 474 degrees, thus having heat resistance equivalent to or higher than that of conventional polyimide.

The 1,1,1-trifluoro-2,2-bisarylethane targeted in the present invention can be used as an excellent optical material characterized by physical properties of low dielectric constant, low refractive index, high transparency, and high solubility.

This application claims priority based on Japanese Patent Application No. 2019-019823 filed on Feb. 6, 2019, the disclosure of which is herein incorporated by reference in its entirety.

The invention claimed is:

1. A production method for obtaining 1,1,1-trifluoro-2,2-bisarylethane, the method comprising subjecting an aryl compound represented by General

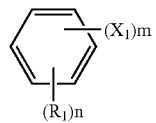

[1]

wherein, in General Formula [1], $X_1$ each independently represents a hydroxyl group, an amino group, a carboxyl group, or a halogen, m represents an integer of 0 to 3, $R_1$ each independently represents a monovalent organic group, and n represents an integer of 0 to (5-m), to a condensation reaction with a mixture of fluoral and hydrogen fluoride under anhydrous conditions, the 1,1,1-trifluoro-2,2-bisarylethane being represented by

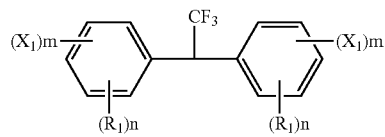

[2]

wherein, in General Formula [2], $X_1$, $R_1$, m, and n each have the same definition as $X_1$, $R_1$, m, and n in General Formula [1].

2. The production method according to claim 1, wherein a Lewis acid or a Bronsted acid is added as an additive to the reaction.

3. The production method according to claim 2, wherein the Lewis acid or the Bronsted acid is at least one selected from the group consisting of an inorganic acid, an organic acid, and a metal halide.

4. The production method according to claim 3, wherein the inorganic acid is at least one selected from the group consisting of phosphoric acid, hydrogen chloride, hydrogen bromide, concentrated nitric acid, concentrated sulfuric acid, fuming nitric acid, and fuming sulfuric acid, and the organic acid is at least one selected from the group consisting of formic acid, acetic acid, oxalic acid, benzoic acid, methanesulfonic acid, benzenesulfonic acid, paratoluenesulfonic acid, and trifluoromethanesulfonic acid.

5. The production method according to claim 3, wherein the metal halide is a metal halide containing at least one metal selected from the group consisting of boron (III), tin (II), tin (IV), titanium (IV), zinc (II), aluminum (III), antimony (III), and antimony (V).

6. The production method according to claim 5, wherein the metal halide is at least one selected from the group consisting of boron (III) trifluoride, aluminum (III) trichloride, zinc (II) dichloride, titanium (IV) tetrachloride, tin (IV) tetrachloride, and antimony (V) pentachloride.

7. The production method according to claim 1, wherein the reaction is carried out without using an organic solvent.

8. The production method according to claim 1, wherein the reaction is carried out in a temperature range of −20° C. to +200° C. and a pressure range of 0.1 MPa to 4.0 MPa (absolute pressure).

9. 1,1,1-trifluoro-2,2-bisarylethane represented by

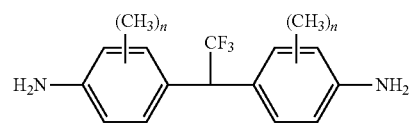

[3]

wherein, in Formula [5], n represents an integer of 1 to 4.

10. The 1,1,1-trifluoro-2,2-bisarylethane according to claim 9, which is 1,1,1-trifluoro-2,2-bis (3-amino-4-hydroxyphenyl) ethane represented by

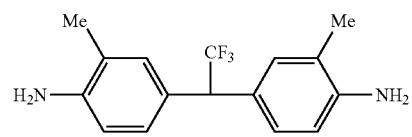

[3a]

11. 1,1,1-trifluoro-2,2-bisarylethane represented by Formula [7], with the proviso that the following compounds are excluded:

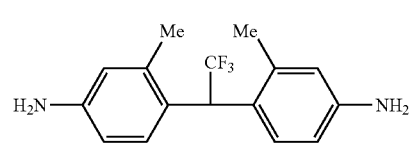

[3b]

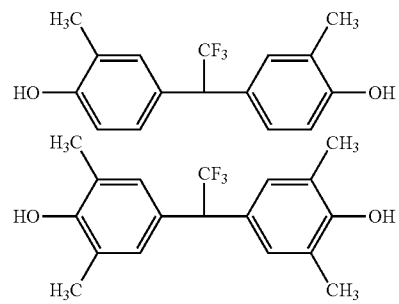

wherein, in Formula [7], n represents an integer of 1 to 4.

12. The 1,1,1-trifluoro-2,2-bisarylethane according to claim 11, which is 1,1,1-trifluoro-2,2-bis (2,5-dimethyl-4-hydroxyphenyl) ethane represented by Formula [7a]:
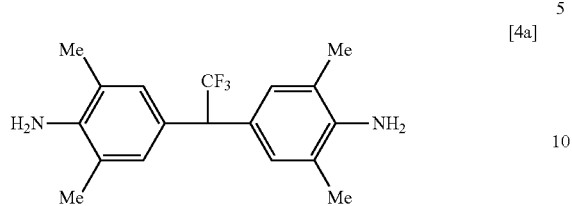
[4a]
wherein, in Formula [7a], Me represents a methyl group.